(12) United States Patent
Ballard et al.

(10) Patent No.: US 8,043,695 B2
(45) Date of Patent: Oct. 25, 2011

(54) HEAT SHRINKABLE FOAMED SHEET

(75) Inventors: Otis Jerome Ballard, Bardstown, KY (US); Kevin Michael Bickett, Shepherdsville, KY (US); Bruce Larry Atcher, Elizabethtown, KY (US); Minoru Hasegawa, Osaka (JP)

(73) Assignee: American Fuji Seal, Inc., Bardstown, KY (US)

( * ) Notice: Subject to any disclaimer, the term of this patent is extended or adjusted under 35 U.S.C. 154(b) by 899 days.

(21) Appl. No.: 11/909,124

(22) PCT Filed: May 14, 2007

(86) PCT No.: PCT/US2007/011505
§ 371 (c)(1),
(2), (4) Date: Sep. 19, 2007

(87) PCT Pub. No.: WO2008/097240
PCT Pub. Date: Aug. 14, 2008

(65) Prior Publication Data
US 2009/0233024 A1    Sep. 17, 2009

Related U.S. Application Data

(60) Provisional application No. 60/899,392, filed on Feb. 5, 2007.

(51) Int. Cl.
*B32B 3/26* (2006.01)
*B32B 1/08* (2006.01)

(52) U.S. Cl. .................. 428/318.8; 428/36.5; 428/34.9; 428/315.5; 428/315.7; 428/318.4; 428/318.6

(58) Field of Classification Search ............... 428/34.9, 428/318.4, 318.6, 318.8, 36.5, 315.5, 315.7
See application file for complete search history.

(56) References Cited

U.S. PATENT DOCUMENTS

| | | | |
|---|---|---|---|
| 3,979,000 | A | 9/1976 | Karabedian |
| 5,322,664 | A | 6/1994 | Blackwelder |
| 5,342,560 | A | 8/1994 | Sturm et al. |
| 5,674,602 | A | 10/1997 | Karabedian et al. |
| 5,925,450 | A | 7/1999 | Karabedian et al. |
| 6,071,580 | A * | 6/2000 | Bland et al. .................. 428/36.5 |
| 6,406,653 | B1 | 6/2002 | Blackwelder et al. |
| 2003/0118750 | A1* | 6/2003 | Bourdelais et al. ............ 428/1.3 |
| 2005/0181196 | A1* | 8/2005 | Aylward et al. ............ 428/304.4 |

FOREIGN PATENT DOCUMENTS

JP    07-032525    2/1995

OTHER PUBLICATIONS

Supplementary Partial European Search Report dated Oct. 1, 2010, issued for the European Patent Application No. 07794826.3.

* cited by examiner

*Primary Examiner* — Hai Vo
(74) *Attorney, Agent, or Firm* — Edwards Angell Palmer & Dodge LLP

(57) ABSTRACT

In some preferred embodiments, a heat shrinkable foamed sheet has a foamed layer (2) constituting a core layer, and a non-foamed layer (3) constituting a surface skin layer integrally formed on the formed layer. The non-foamed layer (3) is less than about 1.55 μm in maximum surface smoothness measured in accordance with ISO8791-4. Alternatively, by regulating various dimensions of foam cells formed in the foamed layer (2) so as to fall within predetermined ranges, a heat shrinkable foamed sheet excellent in surface smoothness and printing nature can be obtained.

44 Claims, 16 Drawing Sheets

HEAT SHRINKABLE FOAMED SHEET

This application claims priority to U.S. Provisional Application No. 60/899,392 filed on Feb. 5, 2007, the entire disclosure of which is incorporated herein by reference in its entirety.

CROSS REFERENCE TO RELATED APPLICATIONS

This application is an application filed under 35 U.S.C. §111(a) claiming the benefit pursuant to 35 U.S.C. §119(e)(1) of the filing date of U.S. Provisional Application No. 60/899,392 filed on Feb. 5, 2007, pursuant to 35 U.S.C. §111(b).

TECHNICAL FIELD

The present invention relates to a heat shrinkable foamed sheet. Some preferred embodiments relate to a heat shrinkable foamed sheet excellent in glossiness and surface smoothness and also excellent in printing performance.

BACKGROUND ART

The following description sets forth the inventor's knowledge of related art and problems therein and should not be construed as an admission of knowledge in the prior art.

A resin foamed sheet having a heat shrinkable nature, such as, e.g., a foamed polystyrene resin foamed sheet, has been widely applied to various products, such as, e.g., cups, plates, food containers, packaging materials, or packaging labels, in various fields. Particularly, in the case of a heat shrinkable foamed sheet to be used as packaging labels, decoration printing is performed on a surface of the label applied to a glass/plastic container to provide its content's information.

This kind of heat shrinkable resin foamed sheet can be manufactured by a method disclosed in, for example, U.S. Pat. No. 5,925,450 (JP, H07 (1995)-64005, B), U.S. Pat. No. 3,979,000 (JP, S61 (1986)-21826, B), U.S. Pat. No. 5,342,560 (JP, H05 (1993)-505774, A), and JP, H07 (1995)-32525, A.

For example, a general-purpose polystyrene resin as a raw material of a foamed sheet, a nucleus forming agent for forming foamed cells, a spreading agent, and white mineral oil or polybutene acting as a viscosity controlling agent are introduced into a first extruder to be melted therein while adding polymeric ester such as ditridecyl adipate (DTDA) as a plasticizer. Nitrogen or carbon dioxide acting as a foaming agent is added under high pressure to the molten polystyrene and kneaded, and then the resulting melt is transferred to a cooling extruder provided at a rear part of the first extruder to be cooled therein. The transferred melt is cooled to a temperature appropriate to the extrusion, and then sent to an annular die portion provided at the front end of the cooling extruder. On the other hand, non-foamed polystyrene resin is introduced into a second extruder and melted therein, and then transferred to the die portion provided at the front end of the cooling first extruder in a state in which no foam is contained in the molten resin. In this die portion, the extrusion material from the first extruder and the extrusion material from the second extruder are joined together and co-extruded as a cylindrical two-layered sheet in which a non-foamed resin layer is coated on a foamed resin layer.

The inner and outer surfaces of the cylindrical sheet co-extruded from the extrusion die are cooled with air and/or a cooling mandrel. At this time, the sheet is stretched by blowing between the extrusion die and the mandrel ring having a large diameter at a temperature range higher than a softening point of the resin, and then cooled to a temperature which is the softening point or below thereof on a cylindrical mandrel provided at the downstream side of the mandrel ring. During the cooling, tension is applied using nip rolls to be stretched in a longitudinal direction of the sheet, and the stretched sheet is cut in halves with a cutter. The resulting sheet having two layers, i.e., a foamed layer and a non-foamed layer, will be wound.

Especially, in the foamed sheet of this kind to be used as a packaging material, such as, e.g., a label, in addition to mechanical characteristics, such as, e.g., tensile strength, rigidity, shear force, flexibility, and heat shrinkable characteristic, the printing characteristic is also one of important characteristics to provide decoration for giving a visual product image on the surface of the sheet.

In a conventional heat shrinkable foamed sheet, however, such print images with clear print boundaries could not be obtained, for example. Thus, the printing performance was not always satisfactory.

Under the circumstances, the inventors performed various experiments and studies to provide a heat shrinkable foamed sheet excellent in surface glossiness, surface smoothness and printing nature. As a result, they found the fact that in a multi-layer foamed sheet having at least a non-foamed layer as a skin layer small in thickness and a foamed layer as a core layer larger in thickness than the non-foamed layer, various dimensions, such as, e.g., surface smoothness of the non-foamed layer and sizes of foam cells formed in the foamed layer, exert a strong influence on a printing performance of the non-foamed layer constituting the surface skin layer. The inventors further continued experiments and studies and finally made the present invention.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

DISCLOSURE OF INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a heat shrinkable foamed sheet excellent in surface glossiness and surface smoothness preferably used as a packaging heat shrinkable label capable of performing high-grade clear printing while preventing breakage of a container by its cushioning properties and giving thermal insulating properties when the sheet is applied to a container.

Among other potential advantages, some embodiments can provide a heat shrinkable foamed sheet excellent in printing characteristics comprising at least two layers consisting of a non-foamed layer and a foamed layer, i.e., a non-foamed polystyrene layer excellent in surface glossiness and surface smoothness and a foamed polystyrene layer.

According to a first aspect of a preferred embodiment of the present invention, a heat shrinkable foamed sheet, comprising:

a foamed layer constituting a core layer; and a non-foamed layer constituting a surface skin layer integrally formed on the formed layer, wherein the non-foamed layer is less than about 1.55 µm in maximum surface smoothness measured in accordance with ISO8791-4.

In the aforementioned heat shrinkable formed sheet, preferably, the maximum surface smoothness is about 1.49 µm or less.

According to a second aspect of a preferred embodiment of the present invention, a heat shrinkable foamed sheet, comprising:

a foamed layer constituting a core layer; and a non-foamed layer constituting a surface skin layer integrally formed on the formed layer, wherein the foamed layer is less than about 20.4 µm in average equivalent diameter of foamed cells formed in the foamed layer in a cross-section taken along an extrusion direction of the formed layer and less than about 20.0 µm in average equivalent diameter of foamed cells formed in the foamed layer in a cross-section taken along a direction perpendicular to the extrusion direction.

In the aforementioned heat shrinkable formed sheet, it is preferable that the average equivalent diameter of the foamed cells in the cross-section taken along the extrusion direction of the formed layer is about 18.8 µm or less and the average equivalent diameter of the foamed cells in the cross-section taken along the direction perpendicular to the extrusion direction is about 19.2 µm or less. More preferably, the average equivalent diameter of the foamed cells in the cross-section taken along the extrusion direction of the formed layer is about 17.1 µm or less and the average equivalent diameter of the foamed cells in the cross-section taken along the direction perpendicular to the extrusion direction is about 18.4 µm or less.

In the aforementioned heat shrinkable formed sheet, preferably, the maximum surface smoothness of the non-foamed layer is less than about 1.55 µM. More preferably, the maximum surface smoothness of the non-foamed layer is about 1.49 µm or less.

According to a third aspect of a preferred embodiment of the present invention, a heat shrinkable foamed sheet, comprising:

a foamed layer constituting a core layer; and a non-foamed layer constituting a surface skin layer integrally formed on the formed layer, wherein the foamed layer is less than about 231.5 µm in average length of foamed cells formed in the foamed layer in a cross-section taken along an extrusion direction of the formed layer.

In the aforementioned heat shrinkable formed sheet, preferably, the average length of the foamed cells of the foamed layer in the cross-section taken along the extrusion direction of the formed layer is about 199.3 µm or less. More preferably, the average length of the foamed cells of the foamed layer in the cross-section taken along the extrusion direction of the formed layer is about 167.0 µm or less and the average length of the foamed cells of the foamed layer in the cross-section taken along the direction perpendicular to the extrusion direction of the formed layer is about 66.2 µm or less.

In the aforementioned heat shrinkable formed sheet, preferably, the maximum surface smoothness of the non-foamed layer is less than about 1.55 µm. More preferably, the maximum surface smoothness of the non-foamed layer is about 1.49 µm or less.

According to a fourth aspect of a preferred embodiment of the present invention, a heat shrinkable foamed sheet, comprising:

a foamed layer constituting a core layer; and a non-foamed layer constituting a surface skin layer integrally formed on the formed layer, wherein the foamed layer is less than about 15.0 µm in average height of foamed cells formed in the foamed layer in a cross-section taken along an extrusion direction of the formed layer and the foamed layer is less than about 15.2 µm in average height of the foamed cells formed in the foamed layer in a cross-section taken along a direction perpendicular to the extrusion direction of the formed layer.

In the aforementioned heat shrinkable foamed sheet, preferably, the average height of the foamed cells formed in the foamed layer in the cross-section taken along the extrusion direction of the formed layer is about 13.5 µm or less and the average height of the foamed cells formed in the foamed layer in the cross-section taken along the direction perpendicular to the extrusion direction of the formed layer is about 13.4 µm or less. More preferably, the average height of the foamed cells formed in the foamed layer in the cross-section taken along the extrusion direction of the formed layer is about 12.0 µm or less and the average height of the foamed cells formed in the foamed layer in the cross-section taken along the direction perpendicular to the extrusion direction of the formed layer is less than about 11.6 µm.

In the aforementioned heat shrinkable foamed sheet, preferably, the maximum surface smoothness of the non-foamed layer is less than about 1.55 µm. More preferably, the maximum surface smoothness of the non-foamed layer is about 1.49 µm or less.

According to a fifth aspect of a preferred embodiment of the present invention, a heat shrinkable foamed sheet, comprising:

a foamed layer constituting a core layer; and a non-foamed layer constituting a surface skin layer integrally formed on the formed layer, wherein the foamed layer is less than about 2,511.6 $\mu m^2$/cell in average area of foamed cells formed in the foamed layer in a cross-section taken along an extrusion direction of the formed layer and the foamed layer is less than about 970.7 $\mu m^2$/cell in average area of foamed cells formed in the foamed layer in a cross-section taken along a direction perpendicular to the extrusion direction of the formed layer.

In the aforementioned heat shrinkable foamed sheet, preferably, the average area of the foamed cells in the cross-section taken along the extrusion direction of the formed layer is about 1,986.8 $\mu m^2$/cell or less and the average area of the foamed cells in the cross-section taken along the direction perpendicular to the extrusion direction of the formed layer is about 759.9 $\mu m^2$/cell or less. More preferably, the average area of the foamed cells in the cross-section taken along the extrusion direction of the formed layer is about 1,462.0 $\mu m^2$/cell or less and the average area of the foamed cells in the cross-section taken along the direction perpendicular to the extrusion direction of the formed layer is about 549.1 $\mu m^2$/cell or less.

In the aforementioned heat shrinkable foamed sheet, preferably, the maximum surface smoothness of the non-foamed layer is less than about 1.55 µm. More preferably, the maximum surface smoothness of the non-foamed layer is about 1.49 µm or less.

According to a sixth aspect of a preferred embodiment of the present invention, a heat shrinkable foamed sheet, comprising:

a foamed layer constituting a core layer; and a non-foamed layer constituting a surface skin layer integrally formed on the formed layer, wherein the foamed sheet is less than about 468.7 µm in average circumferential length of foamed cells formed in the foamed layer in a cross-section taken along an extrusion direction of the formed layer.

In the aforementioned heat shrinkable foamed sheet, preferably, the average circumferential length of the foamed cells in the cross-section taken along the extrusion direction of the formed layer is about 405.4 µm or less. More preferably, the average circumferential length of the foamed cells in the cross-section taken along the extrusion direction of the formed layer is about 342.1 µm or less and the average circumferential length of the foamed cells in the cross-section taken along the direction perpendicular to the extrusion direction of the formed layer is about 138.0 µm or less.

In the aforementioned heat shrinkable foamed sheet, preferably, the maximum surface smoothness of the non-foamed layer is less than about 1.55 µm. More preferably, the maximum surface smoothness of the non-foamed layer is about 1.49 µm or less.

According to a seventh aspect of a preferred embodiment of the present invention, a heat shrinkable foamed sheet, comprising:

a foamed layer constituting a core layer; and a non-foamed layer constituting a surface skin layer integrally formed on the formed layer, wherein the foamed layer exceeds about 195.5 cells/mm$^2$ in average number of foamed cells formed in the foamed layer per unit area in a cross-section taken along an extrusion direction of the formed layer.

In the aforementioned heat shrinkable foamed sheet, preferably, the average number of foamed cells formed in the foamed layer per unit area in the cross-section taken along the extrusion direction is about 272.5 cells/mm$^2$ or more. More preferably, the average number of foamed cells formed in the foamed layer per unit area in the cross-section taken along the extrusion direction of the formed layer is about 349.5 cells/mm$^2$ or more and the average number of the foamed cells formed in the foamed layer per unit area in the cross-section taken along the direction perpendicular to the extrusion direction of the formed layer exceeds about 647.9 cells/mm$^2$.

In the aforementioned heat shrinkable foamed sheet, preferably, the maximum surface smoothness of the non-foamed layer is less than about 1.55 µm. More preferably, the maximum surface smoothness of the non-foamed layer is about 1.49 µm or less.

According to an eighth aspect of a preferred embodiment of the present invention, a heat shrinkable foamed sheet, comprising:

a foamed layer constituting a core layer; and a non-foamed layer constituting a surface skin layer integrally formed on the formed layer, wherein the foamed layer is about 167.0 µm or less in average length of foamed cells of the foamed layer in a cross-section taken along an extrusion direction of the formed layer, about 342.1 µm or less in average circumferential length of foamed cells of the foamed layer in the cross-section taken along the extrusion direction of the formed layer, and about 349.5 cells/mm$^2$ or more in average number of foamed cells formed in the foamed layer per unit area in the cross-section taken along the extrusion direction of the formed layer.

In the aforementioned heat shrinkable foamed sheet, preferably, the maximum surface smoothness of the non-foamed layer is less than about 1.55 µm. More preferably, the maximum surface smoothness of the non-foamed layer is about 1.49 µm or less.

According to a ninth aspect of a preferred embodiment of the present invention, a heat shrinkable foamed sheet, comprising:

a foamed layer constituting a core layer; and a non-foamed layer constituting a surface skin layer integrally formed on the formed layer, wherein the foamed layer is about 66.2 µm or less in average length of foamed cells of the foamed layer in a cross-section taken along a direction perpendicular to an extrusion direction of the formed layer, about 138.0 µm or less in average circumferential length of foamed cells of the foamed layer in the cross-section taken along the direction perpendicular to the extrusion direction of the formed layer, and exceeds about 647.9 cells/mm$^2$ in average number of foamed cells formed in the foamed layer per unit area in the cross-section taken along the direction perpendicular to the extrusion direction of the formed layer.

In the aforementioned heat shrinkable foamed sheet, preferably, the maximum surface smoothness of the non-foamed layer is less than about 1.55 µm. More preferably, the maximum surface smoothness of the non-foamed layer is about 1.49 µm or less.

According to a tenth aspect of a preferred embodiment of the present invention, a heat shrinkable foamed sheet, comprising:

a foamed layer constituting a core layer; and a non-foamed layer constituting a surface skin layer integrally formed on the formed layer, wherein the foamed layer is about 17.1 µm or less in average equivalent diameter of foamed cells in a cross-section taken along an extrusion direction of the formed layer and about 18.4 µm or less in average equivalent diameter of the foamed cells in a cross-section taken along a direction perpendicular to the extrusion direction, wherein the foamed layer is about 167.0 µm or less in average length of the foamed cells formed in the foamed layer in the cross-section taken along the extrusion direction of the formed layer and about 66.2 µm or less in average length of the foamed cells of the foamed layer in the cross-section taken along the direction perpendicular to the extrusion direction of the formed layer, wherein the foamed layer is about 12.0.1 µm or less in average height of the foamed cells formed in the foamed layer in the cross-section taken along the extrusion direction of the formed layer and about 11.6 µm or less in average height of the foamed cells formed in the foamed layer in the cross-section taken along the direction perpendicular to the extrusion direction of the formed layer, wherein the foamed layer is about 1,462.0 µm$^2$/cell or less in average area of the foamed cells in the cross-section taken along the extrusion direction of the formed layer and about 549.1 µm$^2$/cell or less in average area of the foamed cells in the cross-section taken along the direction perpendicular to the extrusion direction of the formed layer, wherein the foamed layer is about 342.1 µm or less in average circumferential length of the foamed cells formed in the foamed layer in the cross-section taken along the extrusion direction of the formed layer, and about 138.0 µm or less in the average circumferential length of the foamed cells formed in of the foamed layer in the cross-section taken along the direction perpendicular to the extrusion direction of the formed layer, and wherein the foamed layer is about 349.5 cells/mm$^2$ or more in average number of the foamed cells formed in the foamed layer per unit area in the cross-section taken along the extrusion direction of the formed layer and exceeds about 647.9 cells/mm$^2$ in average number of the foamed cells formed in the foamed layer per unit area in the cross-section taken along the direction perpendicular to the extrusion direction of the formed layer.

In the aforementioned heat shrinkable foamed sheet, preferably, the maximum surface smoothness of the non-foamed layer is less than about 1.55 μM. More preferably, the maximum surface smoothness of the non-foamed layer is about 1.49 μm or less.

According to an eleventh aspect of a preferred embodiment of the present invention, a heat shrinkable foamed sheet, comprising:

a foamed layer constituting a core layer; and a non-foamed layer constituting a surface skin layer integrally formed on the formed layer, wherein the non-foamed layer exceeds about 51.54% in glossiness measured in accordance with ISO2813-1944 in an extrusion direction of the non-foamed layer and exceeds about 25.18% in glossiness measured in accordance with ISO2813-1944 in a direction perpendicular to the extrusion direction of the non-foamed layer.

In the aforementioned heat shrinkable foamed sheet, preferably, the non-foamed layer is about 68.68% or more in glossiness measured in accordance with ISO2813-1944 in an extrusion direction of the non-foamed layer and is about 30.70% or more in glossiness measured in accordance with ISO2813-1944 in a direction perpendicular to the extrusion direction of the non-foamed layer.

In the aforementioned heat shrinkable foamed sheet, it is preferable to satisfy one or more of the conditions as recited in the aforementioned first to tenth aspect of the present invention.

In the aforementioned heat shrinkable foamed sheet, preferably, the foamed layer is formed by extruding a melt from a co-extrusion two-layer annular extrusion die of one of extruders, the melt containing a nucleus forming agent and at least one of polybutene, ditridecyl adipate, diisodecyl adipate, and trioctyl trimellitate blended to a polystyrene resin acting as a main component and further containing at least one of nitrogen, carbon dioxide, and a mixture thereof in a supercritical state, and the non-foamed layer is formed by extruding a resin from the co-extrusion two-layer annular extrusion die of the other of the extruders, the resin being obtained by blending polyolefin, and a compatibilizer of polystyrene and polyolefin with polystyrene as a main component, and melting them in a state in which the non-foamed layer is coated on an inner side of the foamed layer.

According to a twelfth aspect of a preferred embodiment of the present invention, in any one of the aforementioned heat shrinkable sheets, the non-foamed layer has a print layer on a surface thereof.

It should be understood that a heat shrinkable foamed sheet according to the present invention can be a sheet which satisfies any combination of the aforementioned conditions as recited in the first to twelfth aspects of the present invention and the preferable conditions.

According to a thirteenth aspect of a preferred embodiment of the present invention, a container, comprising:

a container main body; and one of the aforementioned heat shrinkable sheets, wherein the heat shrinkable sheet is closely adhered to a peripheral surface of the container main body in a heat shrank manner.

The foamed sheet in which the sizes of the foam cells in the foamed layer fall within the aforementioned ranges is excellent in surface smoothness and therefore it is excellent in printing characteristics. For example, at the time of performing electrostatic printing which is one of precise printing, a smooth surface appropriate to high-grade printing can be obtained. As a result, a heat shrinkable foamed sheet, which can be used as a foamed polystyrene label, capable of giving a high-grade nature to a packaging can be obtained.

In the foamed sheets according to some embodiments, especially in a foamed polystyrene foamed sheet, the smoothness and glossiness of the surface of the non-foamed polystyrene layer corresponding to the printing surface can be improved. Thus, original fabrics of printing heat shrinkable labels can be produced. And the foamed sheet can be used as a heat shrinkable label for containers or cups including beverage containers.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

The heat shrinkable resin foamed sheet 1 according to an embodiment can be used as follows. For example, the sheet 1 is formed into, e.g., a cylindrical shape and then disposed on an external periphery of a packaging container such as a bottle or a cup. Then, heat is applied to the sheet 1 to shrink it, so that the sheet is secured to the container in a closely adhered manner.

Figure 4:
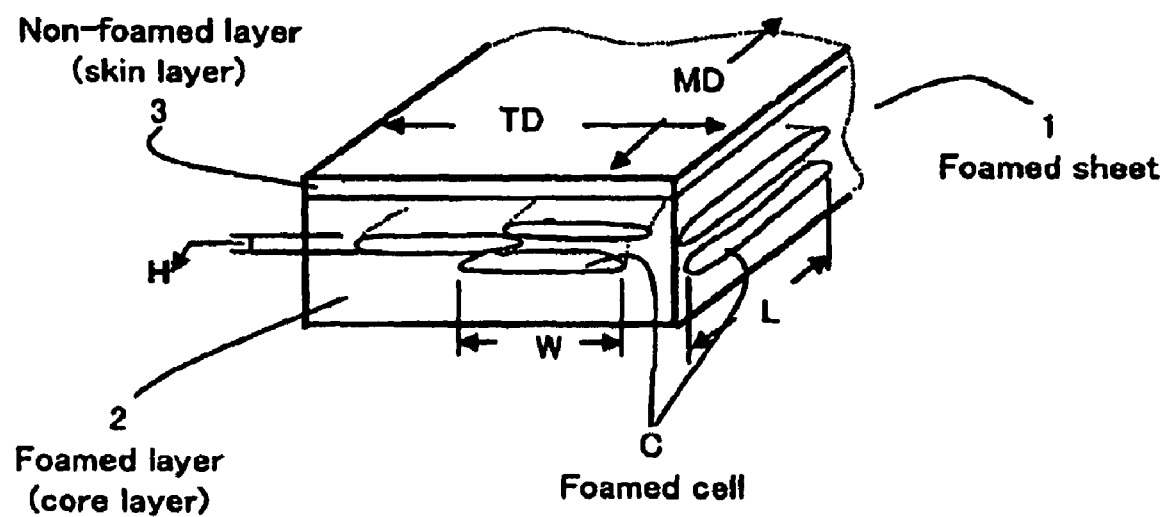
FIG. 4 is a partial cross-sectional view showing a partial cross-section of the heat shrinkable foamed sheet according to the present invention.
Figure 5:
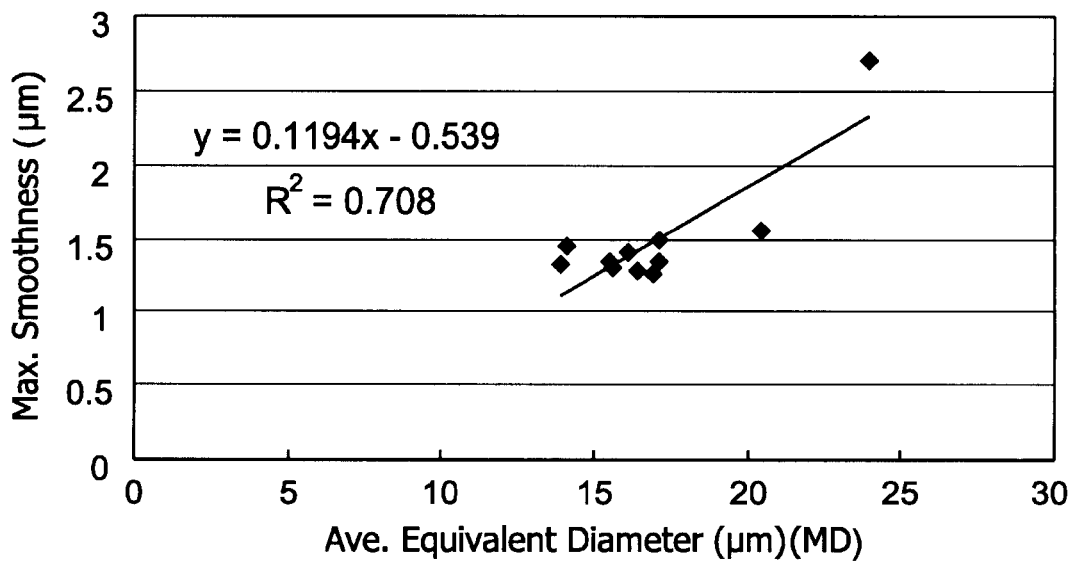
FIG. 5 is a graph of ave. equivalent diameter (μm)(MD) v. max smoothness (μm)
Figure 6:
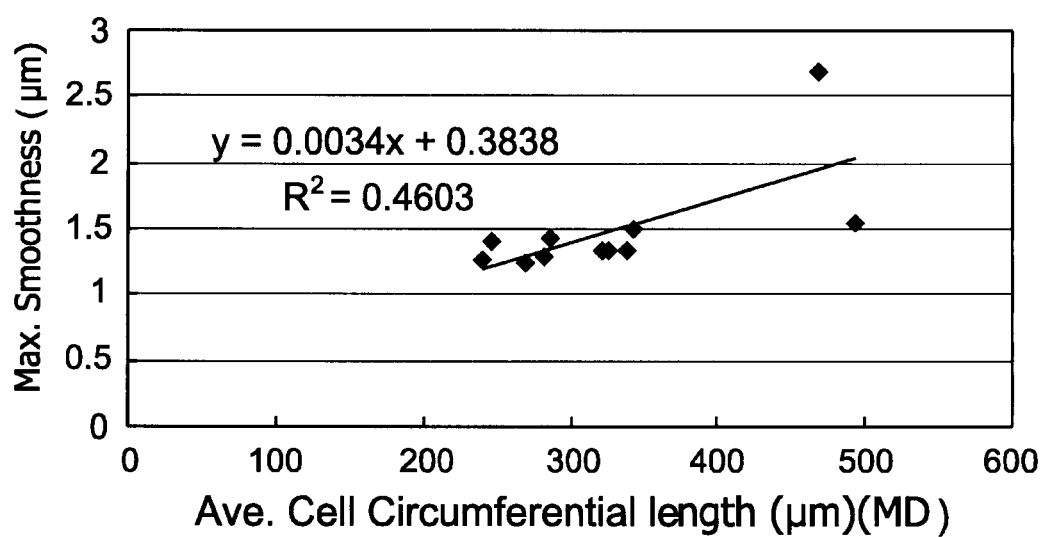
FIG. 6 is a graph of ave. cell circumferential length (μm) (MD) v. max smoothness (μm)
Figure 7:
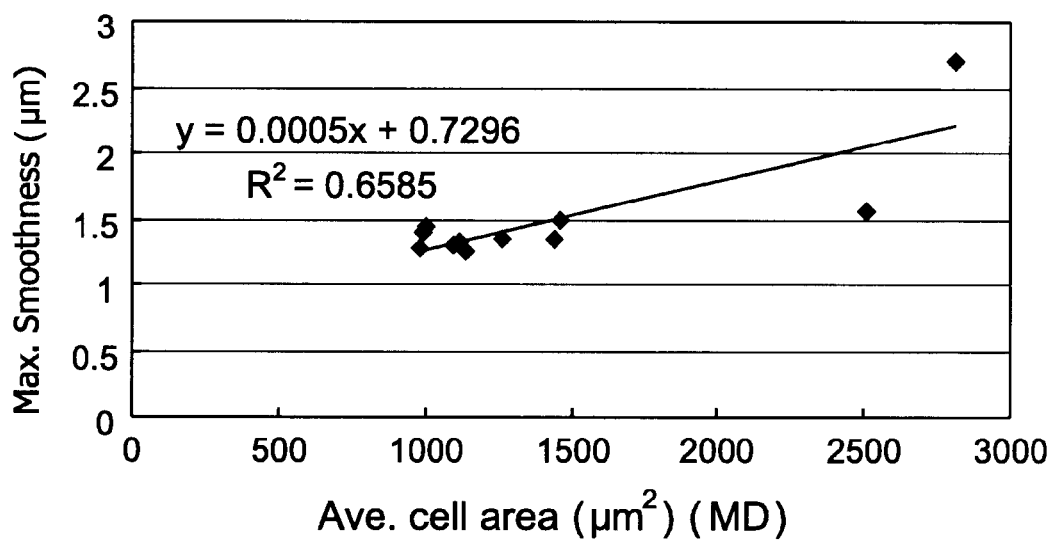
FIG. 7 is a graph of ave. cell area (μm$^2$)(MD) v. max smoothness (μm)
Figure 8:
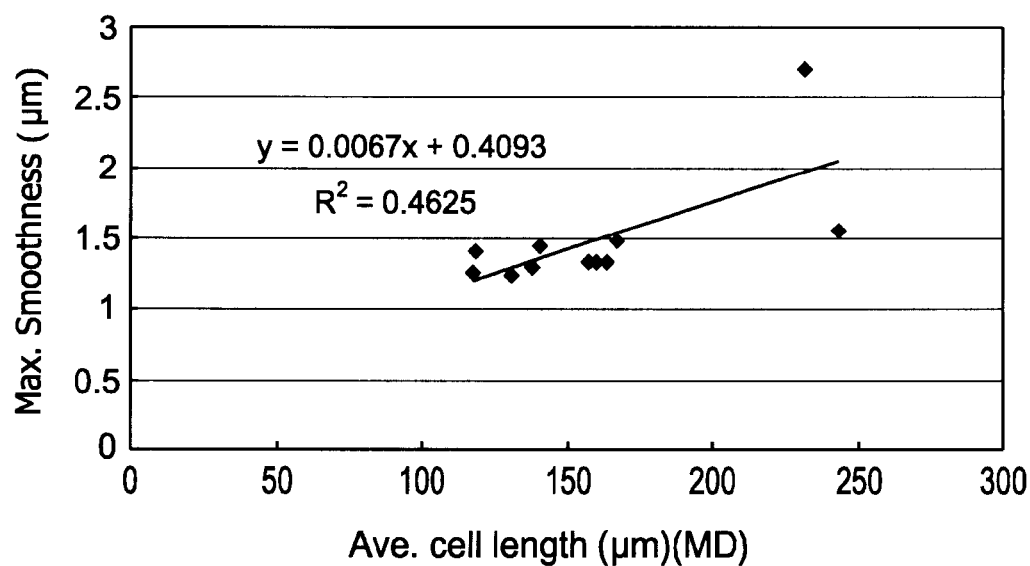
FIG. 8 is a graph of ave. cell length (μm)(MD) v. max smoothness (μm)
Figure 9:
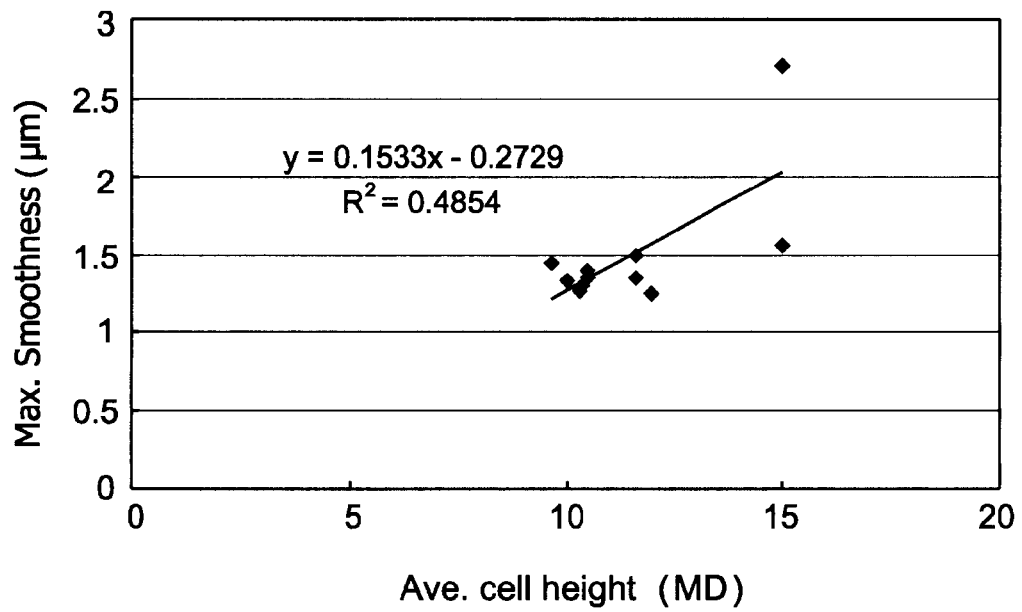
FIG. 9 is a graph of ave. cell height (MD) v. max smoothness (μm)
Figure 10:
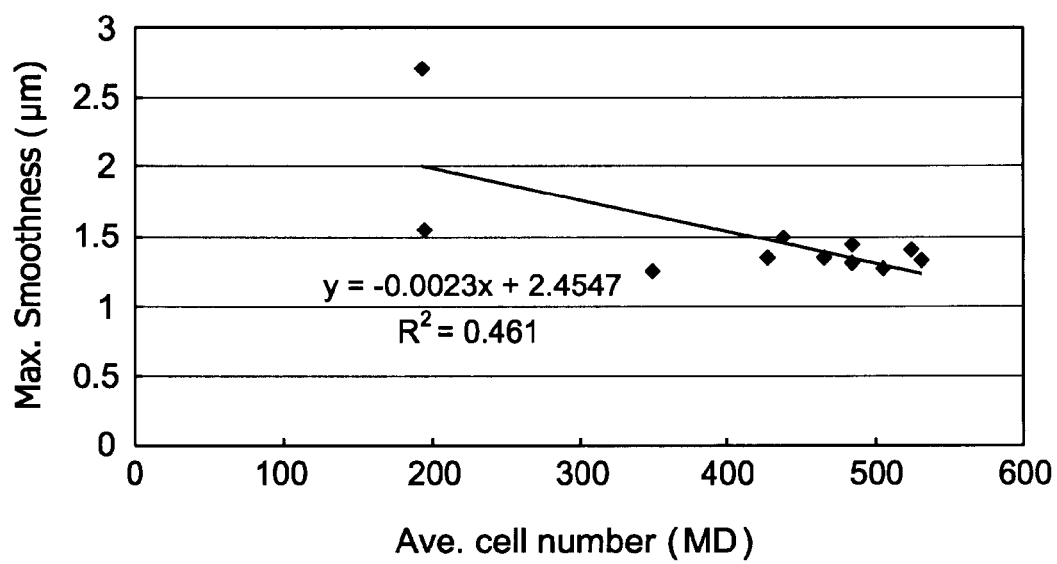
FIG. 10 is a graph of ave. cell number (MD) v. max smoothness (μm)
Figure 11:
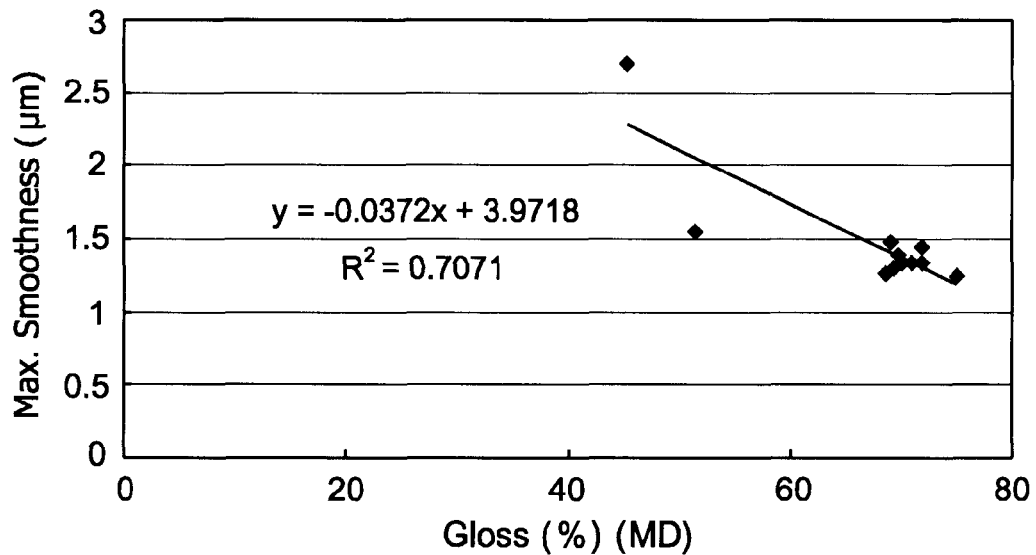
FIG. 11 is a graph of gloss (%)(MD) v. max smoothness (μm)
Figure 12:
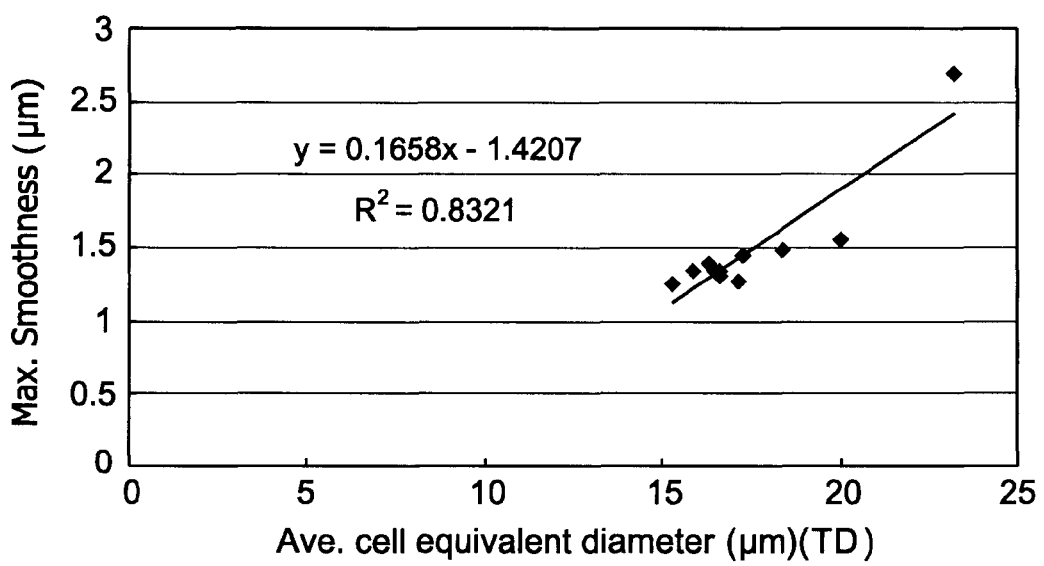
FIG. 12 is a graph of ave. cell equivalent diameter (μm) (TD) v. max smoothness (μm)
Figure 13:
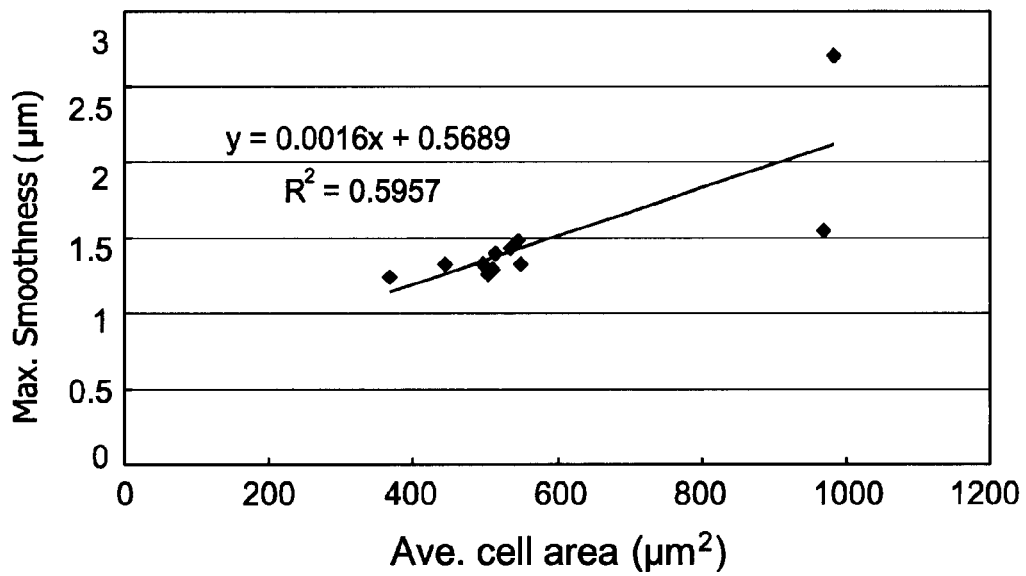
FIG. 13 is a graph of ave. cell area (μm$^2$) v. max smoothness (μm)
Figure 14:
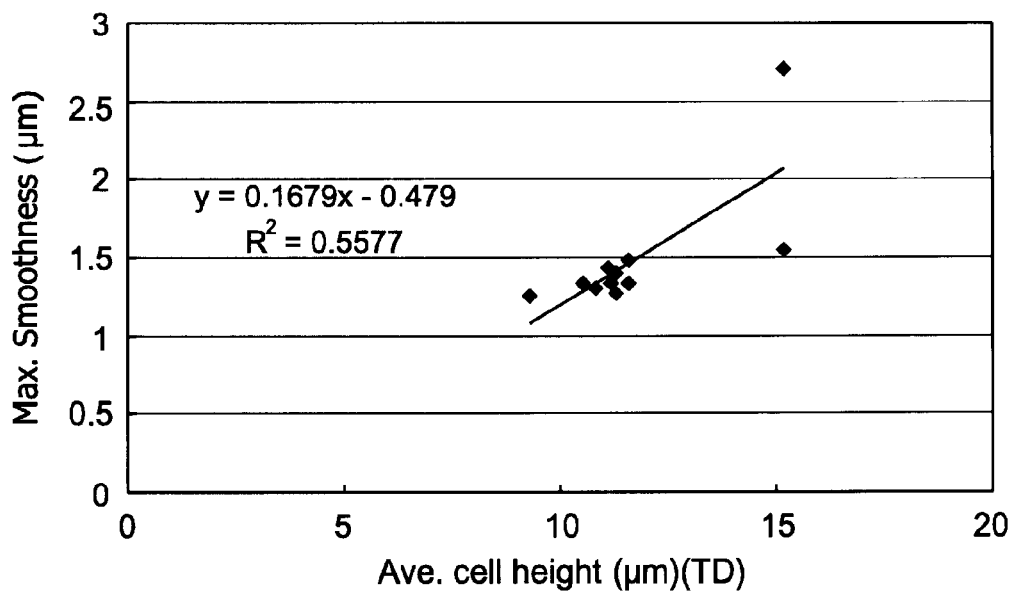
FIG. 14 is a graph of ave. cell height (μm)(TD) v. max smoothness (μm)
Figure 15:
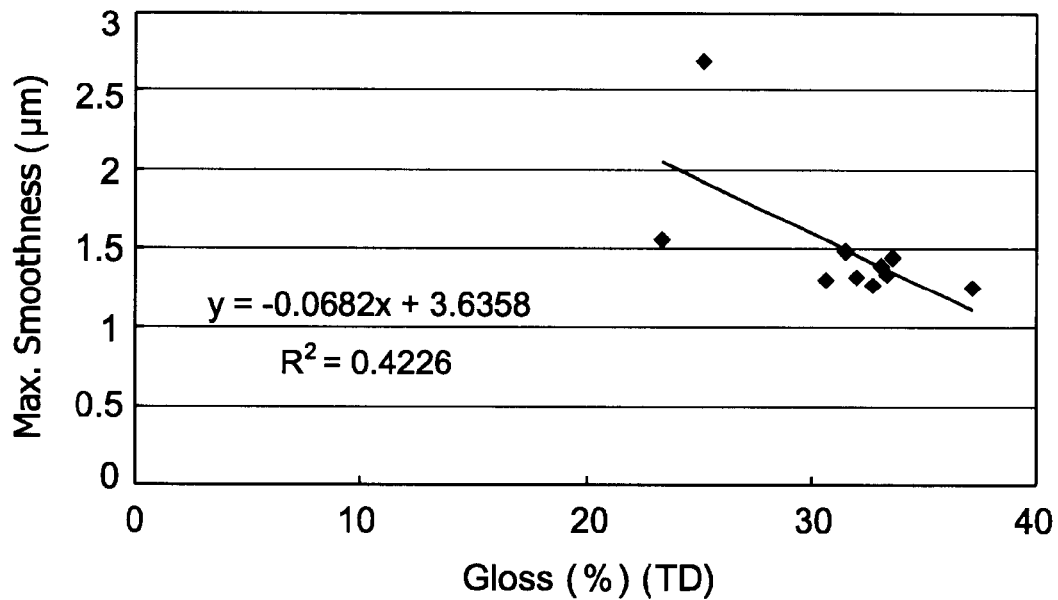
FIG. 15 is a graph of gloss (%)(TD) v. max smoothness (μm)
Figure 16:
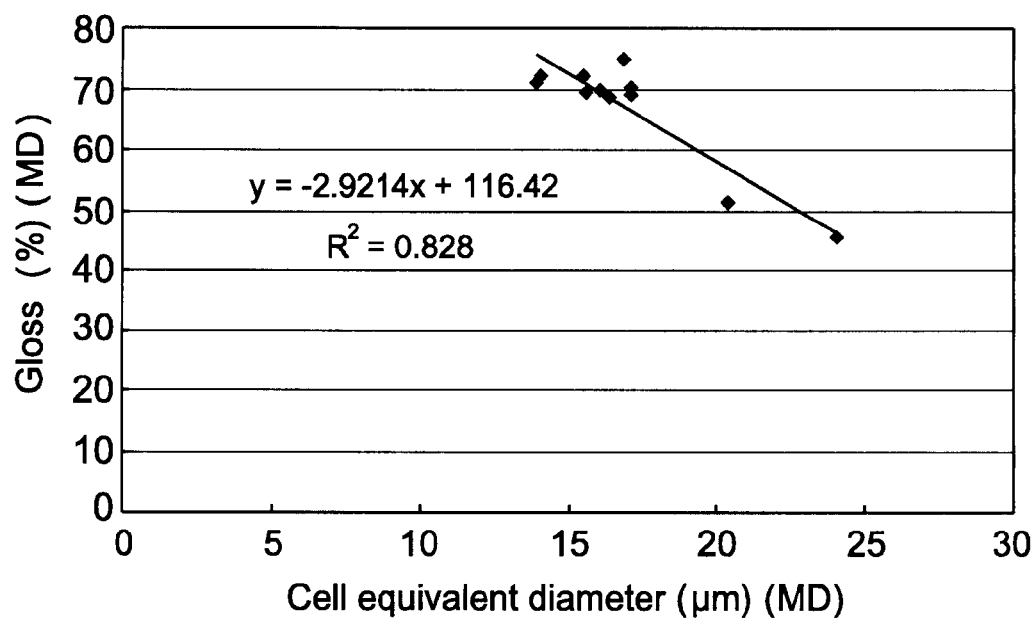
FIG. 16 is a graph of cell equivalent diameter (μm)(MD) v. gloss (%) (MD)
Figure 17:
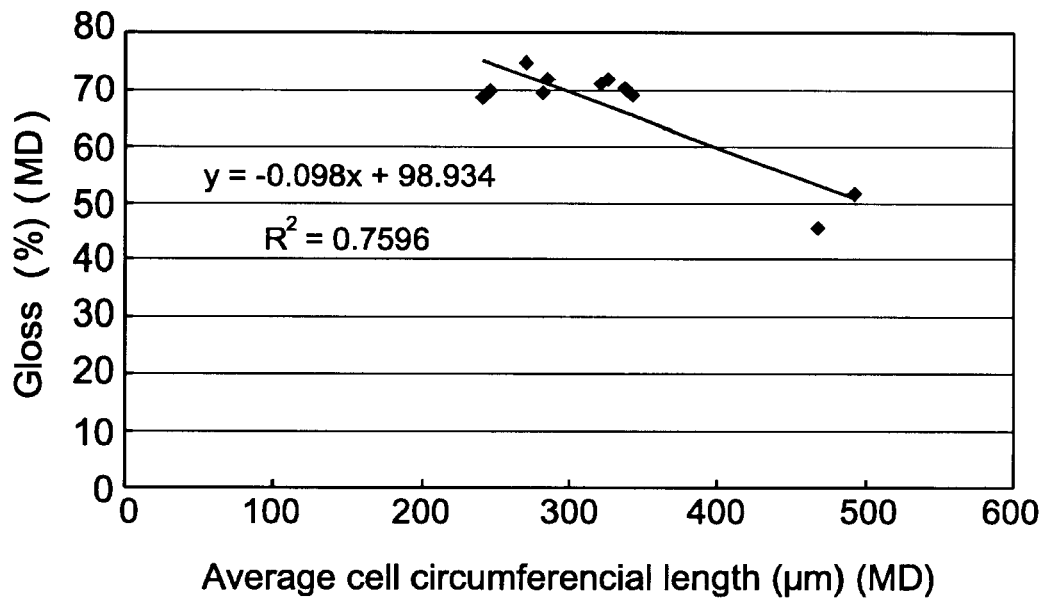
FIG. 17 is a graph of average cell circumferential length (μm)(MD) v. gloss (%) (MD)
Figure 18:
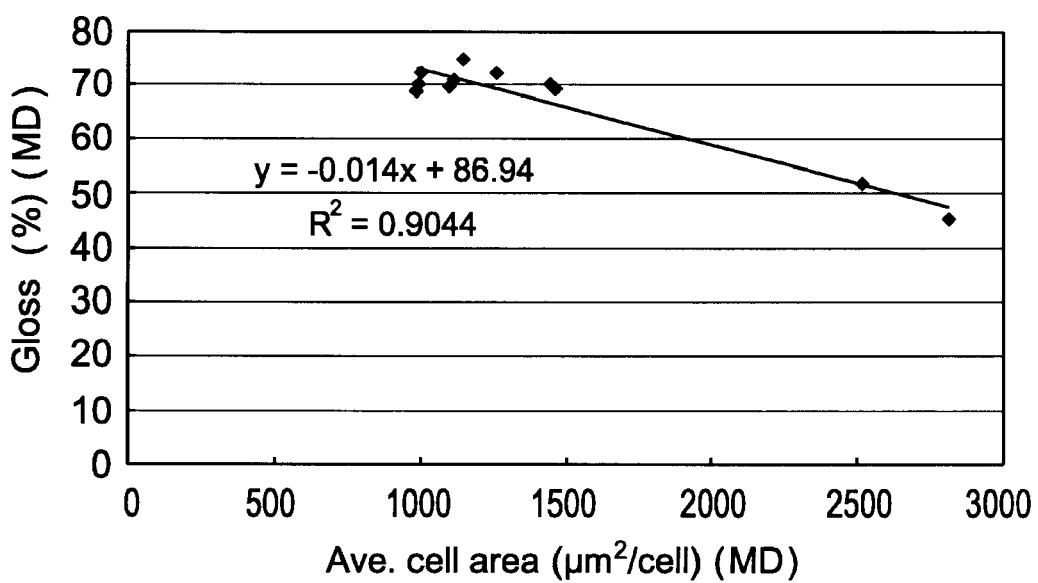
FIG. 18 is a graph of ave. cell area (μm$^2$/cell)(MD) v. gloss (%) (MD)
Figure 19:
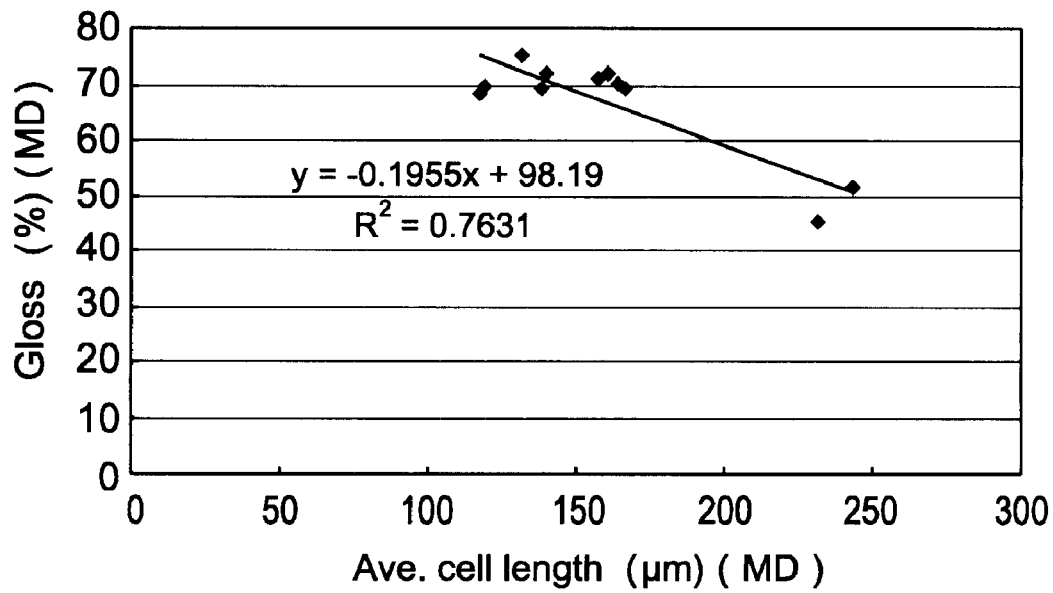
FIG. 19 is a graph of ave. cell length (μm)(MD) v. gloss (%) (MD)
Figure 20:
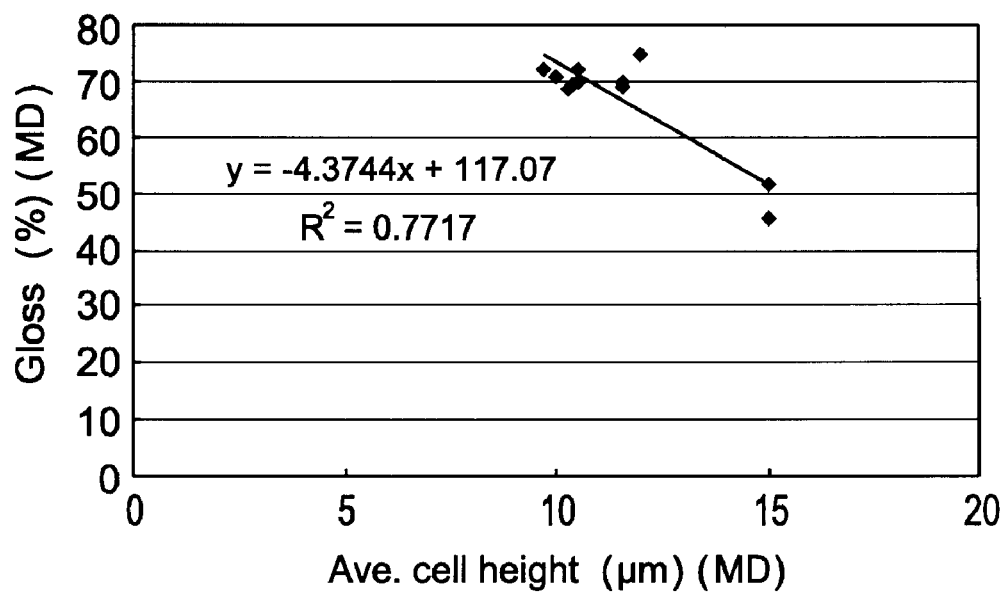
FIG. 20 is a graph of ave. cell height (μm)(MD) v. gloss (%) (MD)
Figure 21:
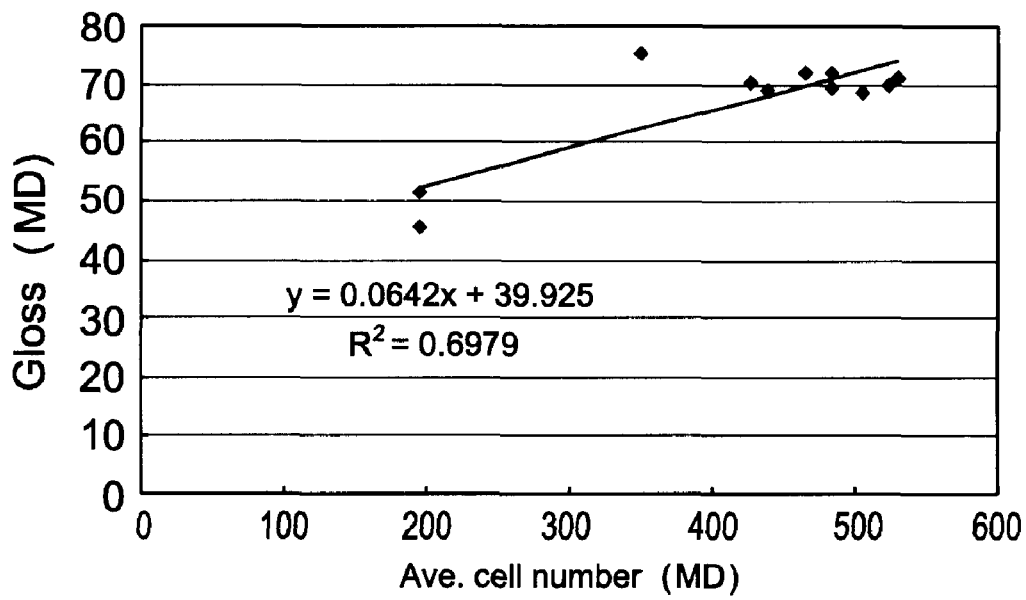
FIG. 21 is a graph of ave. cell number (MD) v. gloss (MD)
Figure 22:
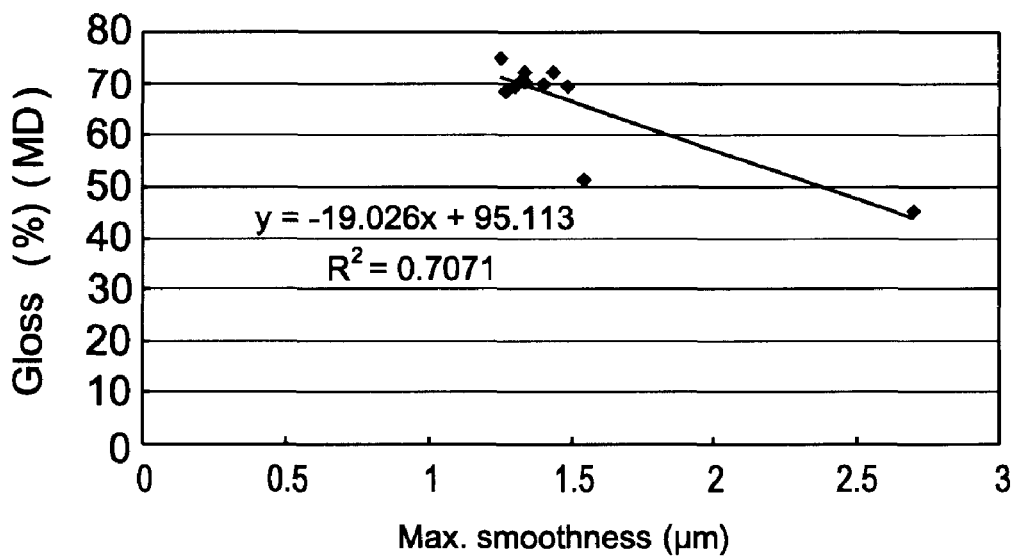
FIG. 22 is a graph of max. smoothness (μm) v. gloss (%) (MD)
Figure 23:
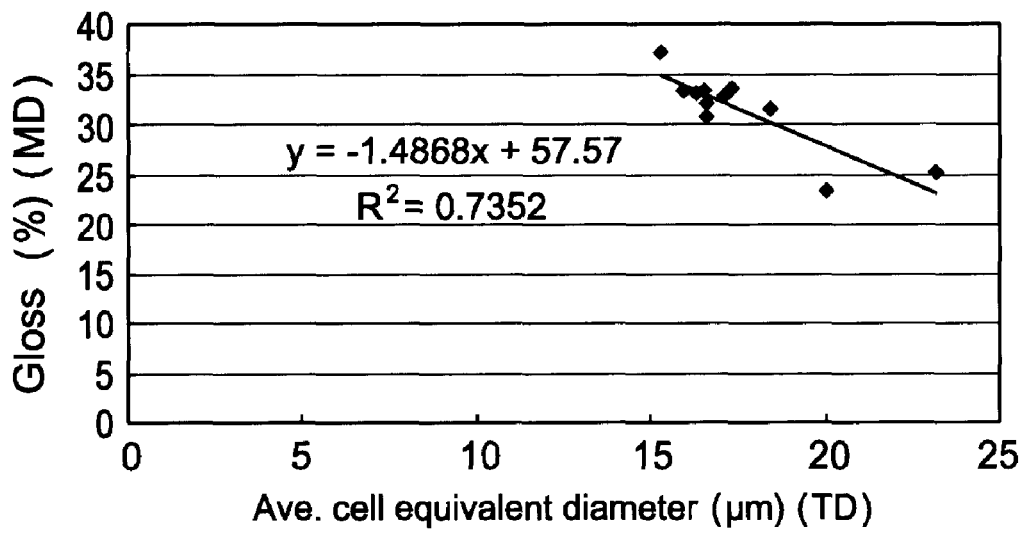
FIG. 23 is a graph of ave. cell equivalent diameter (μm) (TD) v. gloss (%) (MD)
Figure 24:
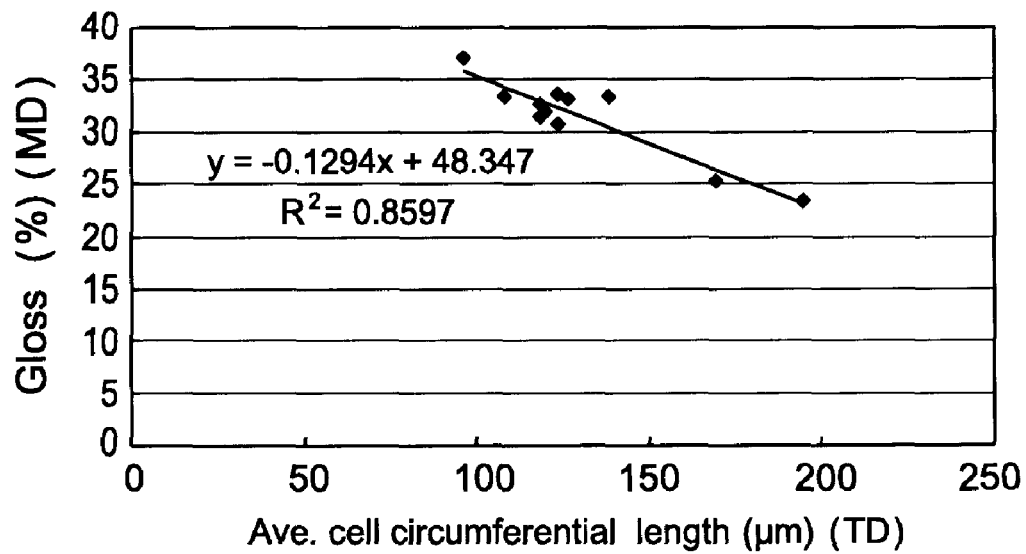
FIG. 24 is a graph of ave. cell circumferential length (μm) (TD) v. gloss (%) (MD)
Figure 25:
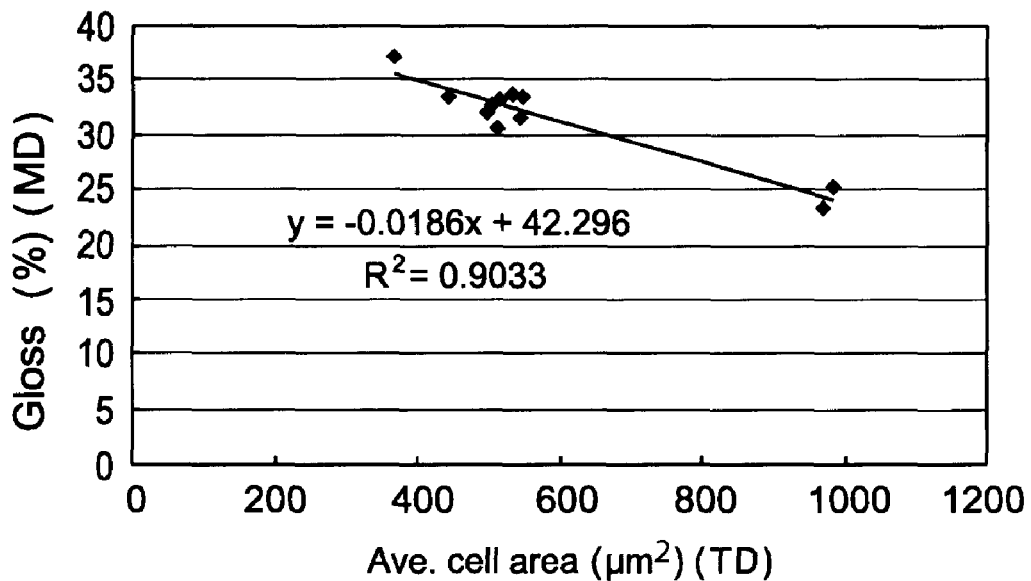
FIG. 25 is a graph of ave. cell area ($\mu m^2$)(TD) v. gloss (%) (MD)
Figure 26:
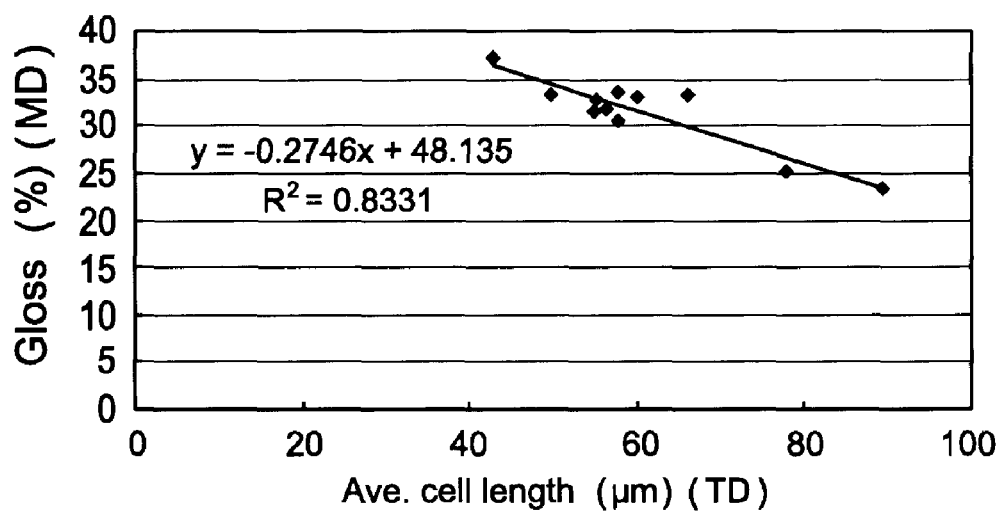
FIG. 26 is a graph of ave. cell length (μm)(TD) v. gloss (%) (MD)
Figure 27:
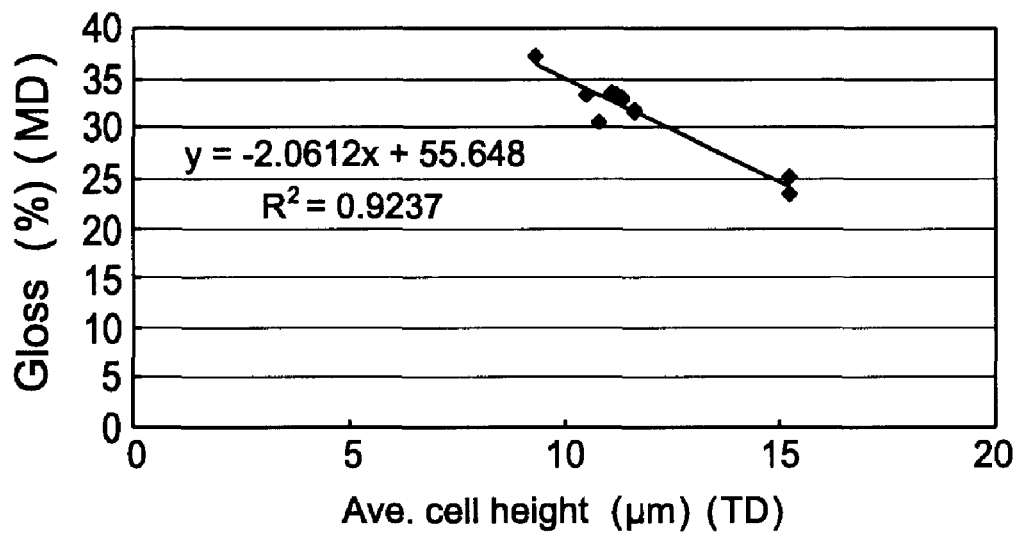
FIG. 27 is a graph of ave. cell height (μm)(TD) v. gloss (%) (MD)
Figure 28:
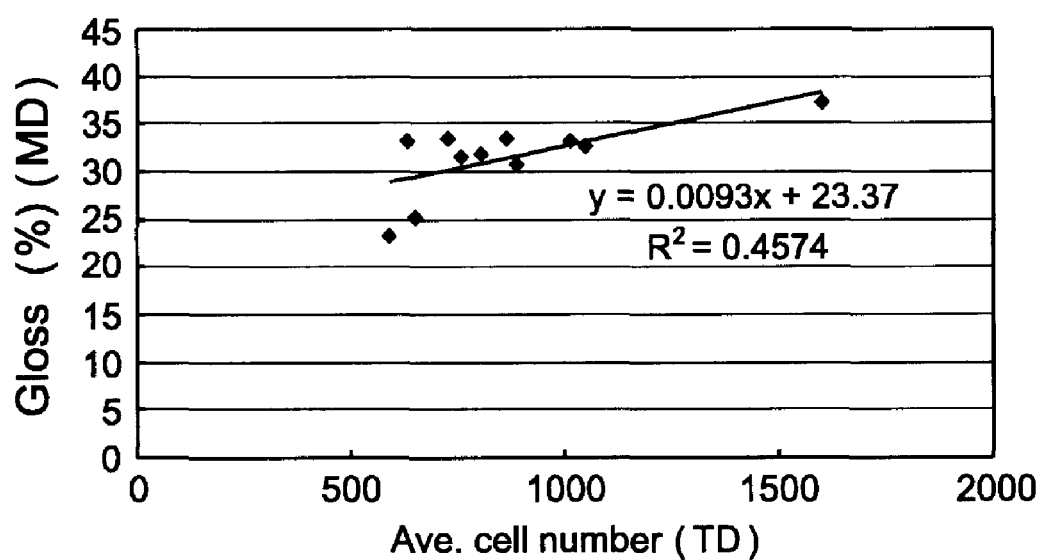
FIG. 28 is a graph of ave. cell number (TD) v. gloss (%) (MD)
Figure 29:
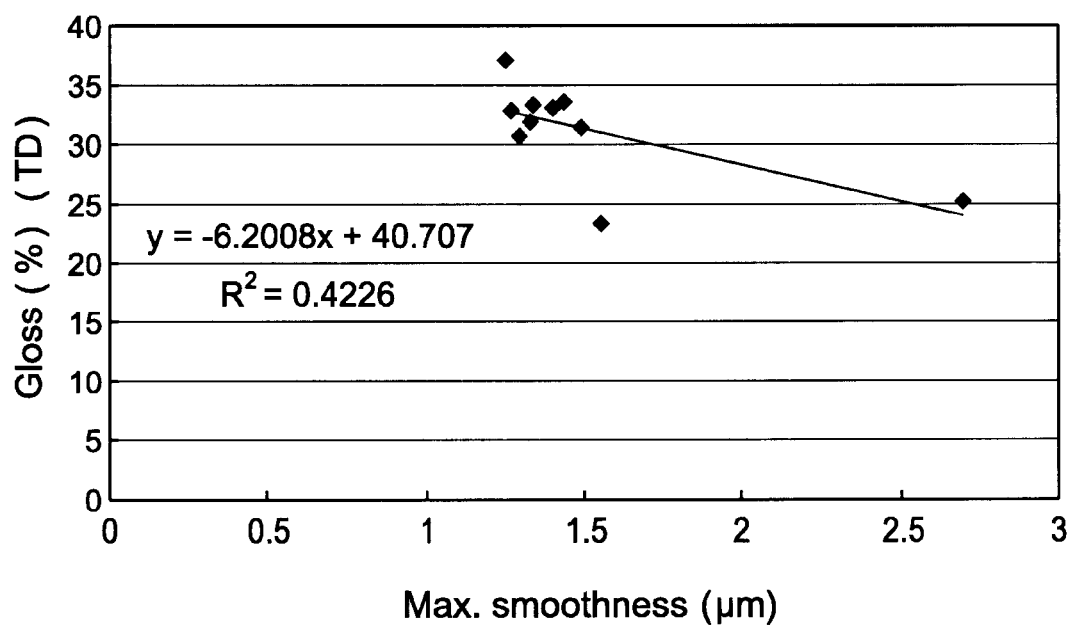
FIG. 29 is a graph of max. smoothness (μm) v. gloss (%) (TD).

As shown in FIG. 4, the heat shrinkable foamed sheet according to this embodiment has a two-layered structure having a foamed layer 2 constituting a core layer having foamed cells C therein and a non-foamed layer 3 constituting a skin layer integrally formed on the foamed layer 2, the non-foamed layer being smaller in thickness than the foamed layer 2. This heat shrinkable foamed sheet is formed by co-extrusion.

Hereinafter, an example of the production method of the heat shrinkable foamed sheet will be explained.

Figure 1:
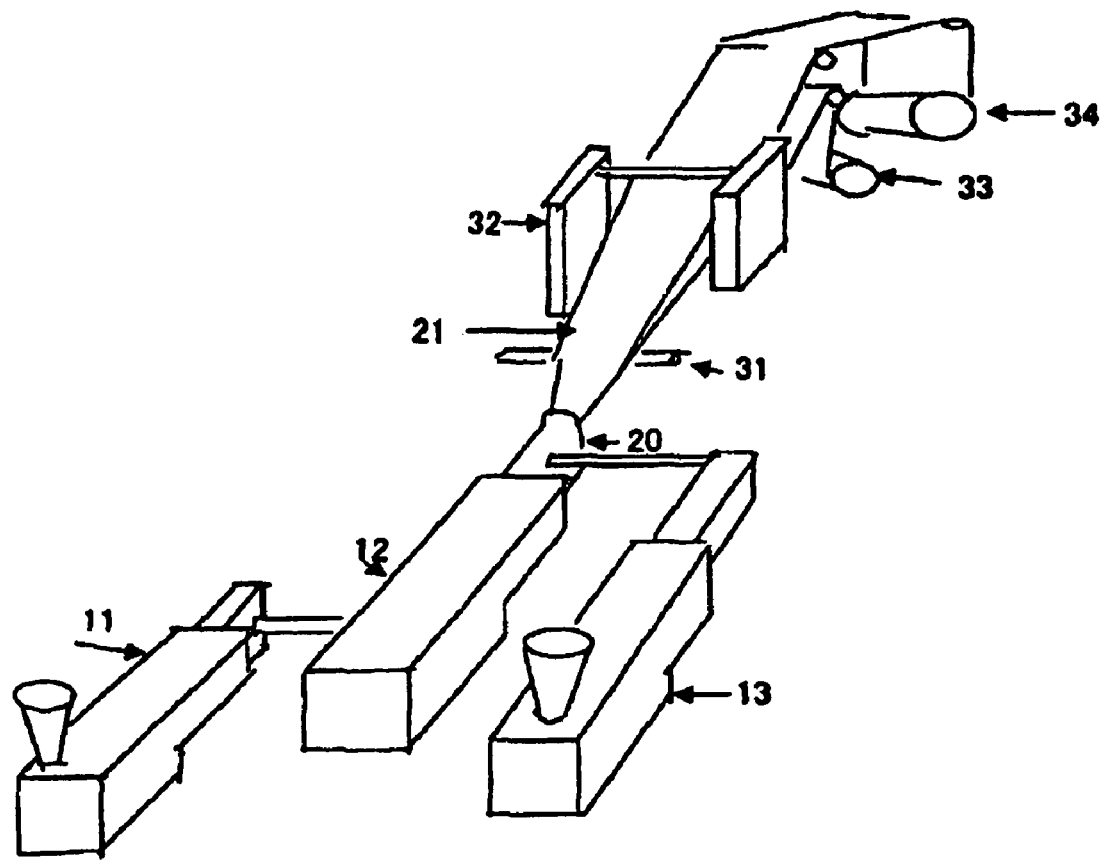
FIG. 1 is a schematic view showing a production apparatus including extruders used to produce a heat shrinkable foamed sheet according to an embodiment of the present invention.
Figure 3:
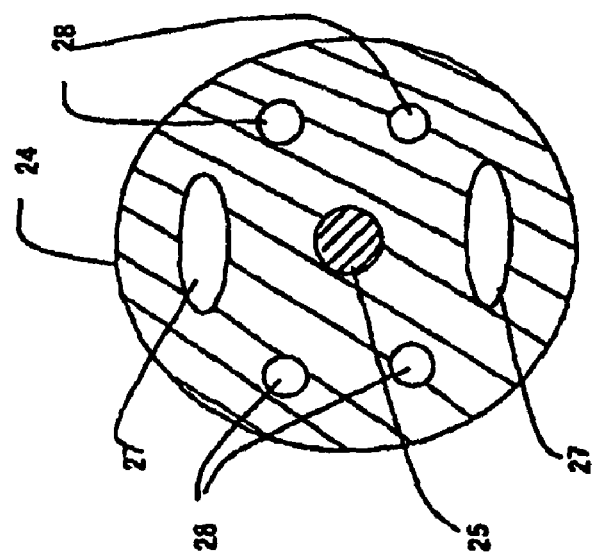
FIG. 3 is a cross-sectional view taken along the line 3-3 in FIG. 2.

FIG. 1 shows an extruder for use in the production method. This extruder includes a first extruder 11, a cooling extruder 12 (melt cooling portion of the first extruder), and a second extruder 13.

As shown in FIG. 1, as to the foamed layer 2 constituting a core layer, for example, polystyrene resin as a raw material is introduced in the first extruder 11 as a primary extruder. At the same time, added to the polystyrene resin are a nucleus forming agent, such as, e.g., sodium bicarbonate or citric acid, a plasticizer, such as, e.g., nonvolatile polymer ester exemplified by asditridecyl adipate (DTDA), and a wetting agent acting as a spreading agent of the nucleus forming agent such as polybutene and having a resin viscosity controlling function. These materials are heated into a molten state. Thereafter, high pressure nitrogen or carbon dioxide acting as a foaming agent is applied to the melt to obtain a polystyrene resin melt in which the nitrogen or carbon dioxide is solved in a supercritical state. The polystyrene resin melt is mixed and kneaded with a screw in a kneading part of the first extruder 11, transported to the cooling extruder 12 (a melt cooling part of the rear part of the first extruder), and cooled to a temperature appropriate to the extrusion. The resulting resin is integrally coated on an upper surface of a non-foamed layer transported in advance from the second extruder 13 within a co-extrusion annular die 20 provided at the front end of the first extruder 12. Thereby, an integral two-layered resin sheet including a foamed layer and a non-foamed layer is extruded into a cylinder shape.

The non-foamed layer 3 (surface skin layer) constituting a liner of the two-layered sheet consisting of the foamed polystyrene layer 2 and the non-foamed polystyrene layer 3 is produced as follows. At the same time of the preparation of the foamed layer 2 (core layer) in the first extruder 11, a mixture of polystyrene and polyolefin (ratio: about 80% of polystyrene, about 5% of polypropylene, and about 15% of additive agent) as the material of the non-foamed polystyrene layer 3 (skin layer) is melted in a barrel of the second extruder 13. The molten mixture is transported to the annular die 20 provided at the front end of the cooling extruder 12 of the first extruder 11 to be joined to the foamed polystyrene layer 2 (core layer) from the first extruder 11, and extruded from the annular die 20 with the two layers with two layers integrated together.

The non-foamed layer resin is not limited to polystyrene resin, but can be any thermosetting resin including, e.g., a butadiene series or acrylic series copolymer resin copolymerized with polystyrene or its mixed resin, or a polyolefin series resin including, e.g., polyethylene, polypropylene, or copolymer thereof. The foamed resin layer can be any thermosetting resin including, e.g., polystyrene series resin, block polymer thereof, copolymer resin or mixed resin copolymerized with butadiene series resin, or polyolefin resin.

The foaming agent can be carbon dioxide, nitrogen, a mixture of carbon dioxide and nitrogen, or nonvolatile gas which cannot be dissolved in a resin in a standard state of the atmosphere. The foaming agent is melted in the molten resin in a supercritical state in the extruder.

The nucleus forming agent can be inorganic and organic foaming nucleus forming agents, such as, e.g., sodium bicarbonates, citric acids, and amide azodicarboxylates, or a mixture thereof.

The wetting agent can be white mineral oil, polybutene, or low-molecular-weight polyethylene wax. The wetting agent is used as a dispersing agent for dispersing the nucleus forming agent into the molten resin.

The plasticizer for providing a heat shrinkage property to the foamed layer 2 and controlling resin viscosity to improve physical properties of the foamed sheet 1, for example, resin properties such as toughness or shear properties of the sheet 1, and extrudability can be a high-molecular-weight ester, such as, e.g., ditridecyl adipate (DTDA), diisodecyl adipate (DIDA), and trioctyl trimellitate (TOTM). About 1% of the plasticizer is added in the resin.

The surface adjustment of the non-foamed sheet 3 (surface skin layer) is important since the surface is served as a printing surface of a label. White pigment is added to control the color tone of the surface to thereby keep the opacity of the sheet surface. Generally, 5 to 10% of titanium oxides are added with respect to the non-foamed layer portion. In addition, in order to increase strength of the foamed sheet, an about 5 to 10% of ethylene-butadiene block copolymer is added as a compatibilizer.

Figure 2:
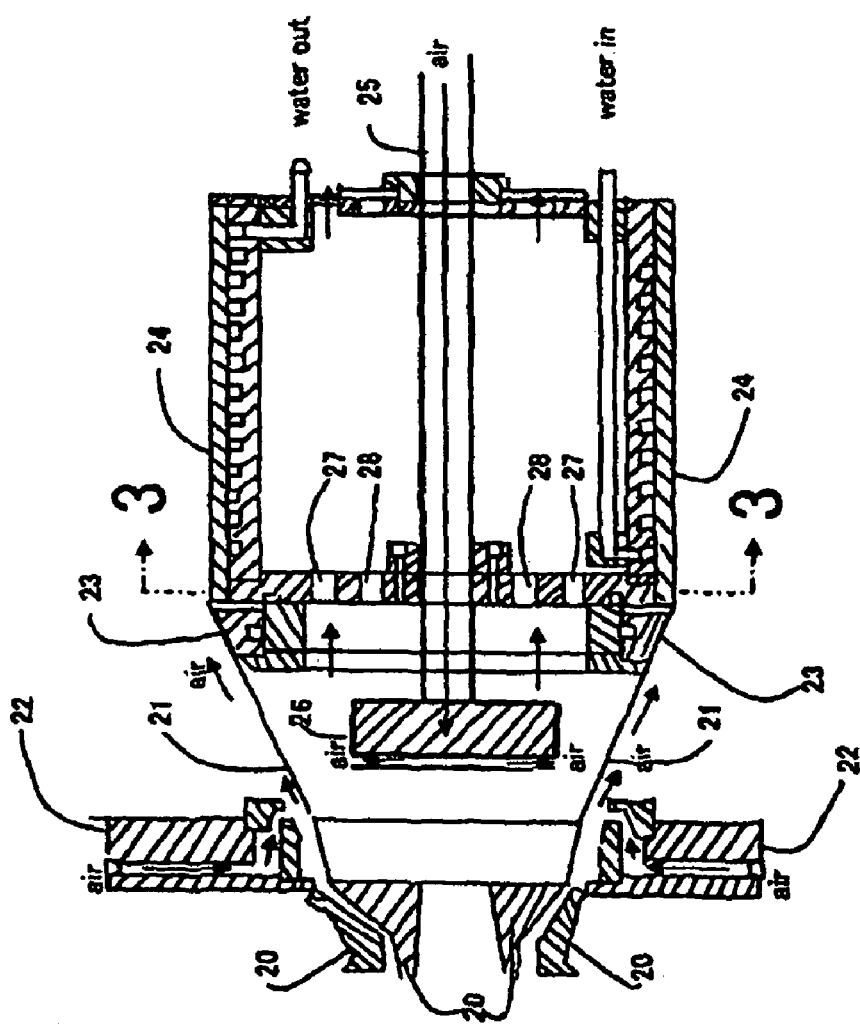
FIG. 2 is a schematic cross-sectional view showing a cooling device located at a front end of the extruder.

As shown in FIG. 2, the extruded cylindrical two-layered sheet 21 is forcibly cooled by blowing cooling air against the outside foamed polystyrene layer from the annular air ring 22 disposed adjacent to the extrusion die 20. An inner ring 26 is provided at the inner surface side of the extruded cylindrical sheet 21, so that the cylindrical sheet 21 is cooled from its inside by air from the inner ring 26. The cooling rate using air can be adjusted by controlling air pressure of air applied to the inner and outer surfaces of the cylinder.

The extruded cylindrical sheet 21 is transported in a state in which the sheet is in contact with the mandrel 24 and cooled. The cylindrical sheet 21 is stretched in the circumference direction thereof toward the mandrel 24 having a diameter larger than the diameter of the extrusion die 20 before the temperature of the sheet 21 drops below the glass transition point. The blowup ratio, which is a ratio of the diameter of the die 20 to that of the mandrel 24, is set to 1.75, which is a typical ratio of a heat shrinkable label.

The cylindrical sheet 21 is cooled using the mandrel 24 to cool the temperature to the glass transition temperature or below. The cooling is performed by both the mandrel 24 and the mandrel ring 23 provided at the upstream side of the mandrel 24.

As shown in FIG. 1, the extruded cylindrical sheet 21 is stretched in the longitudinal direction by applying tension with the nip rolls for winding the sheet 21. The tension can be controlled in accordance with the degree of the required heat shrinkage of the heat shrinkable label.

After being stretched in the longitudinal direction by the tension using the nip rolls, the cylindrical sheet 21 is cut into halves and each will be wound on a reel as a two-layered sheet consisting of a foamed layer and a non-foamed layer.

The obtained heat shrinkable foamed sheet has a non-foamed layer 3 as a surface skin layer excellent in glossiness, hign in grade and excellent in surface smoothness, thereby enabling a clear printing thereon.

Hereinafter, concrete examples will be explained.

Example 1

GPPS having a weight average molecular weight of 280,000 and a meltflow value of about 3.5-4.0 (ASTM standard 12378-70: condition G) and a 1:1 mixture of sodium bicarbonate and citric acid as nucleus forming agent were added to polystyrene resin in a body portion of the first extruder 11 so that the mixture was contained by 1 wt % of the resin, and mixed and melted. After mixing the melt, high-molecular-weight ester ditridecyl adipate and polybutene each serving as a blending agent were added to the melt with a pump (not illustrated) provided on the extrusion line so that each blending agent was contained by 0.5 wt % of the resin. Then, pure nitrogen gas (99.9998% in purity) pressurized to 3,000 psi with a pressure controller (not illustrated) was introduced into the polystyrene resin melt in the first extruder 11 and the melt was kneaded with a screw provided in the body portion of the extruder 11.

The kneaded resin melt was transferred from the first extruder 11 to the cooling extruder 12, and cooled to the temperature appropriate to the extrusion. The cooled resin melt was transferred to a co-extrusion two-layer annular die 20 provided at the front end of the extruder 12. The extrusion temperature was about 340° F.

On the other hand, about 85 parts of crystal polystyrene having a weight-average molecular weight of about 200,000 and a meltflow value of about 7, about 5 parts of polypropylene, about 5 parts of styrene-butadiene block copolymer as compatibilizer, and further about 5 parts of titanium oxides for controlling the color tone of the foamed sheet were introduced into the second extruder 13. The molten resin melt adjusted to 400° F. in temperature was transferred from the second extruder 13 to the annular die (co-extrusion two-layer annular die) 20 provided at the front end of the cooling extruder 12. At the same time, the melt containing nitrogen gas as foaming agent in the first extruder 11 was also transferred to the annular die 20, and co-extruded from an orifice of the annular die 20 (co-extrusion two-layer annular die) with the melt adhered to the upper layer of the non-foamed polystyrene sheet from the second extruder 13.

Immediately after the extrusion of the cylindrical polystyrene sheet 21 from the die 20, generation of foamed cells in the sheet started. The sheet 21 was transferred toward the cooling mandrel 24. At this time, the inner and outer surfaces of the cylindrical foamed sheet 21 were cooled with air at between the extrusion die 20 and the cooling mandrel 24 having a diameter larger than that of the extrusion die 20. Before the temperature of polystyrene drops to the softening point, the sheet cylinder 21 was stretched in the circumference direction to provide heat shrinkage property. The blowup ratio was set to 1.75. Furthermore, in order to simultaneously perform the stretching in the longitudinal direction, tension was applied with nip rolls so that the heat shrinkage ratio became 18% in the extrusion direction (hereinafter may be referred to as "Machine Direction (MD)") at 210° F. as one of heat shrinkable conditions of a heat shrinkable label. Thereafter, the sheet was cut with a cutter 31 and wound on winding rolls 33 and 34.

The target thickness of the co-extruded sheet was set to about 170 μm±25 μm and the target thickness of the non-foamed layer was set to about 13 μm±2 μm at the time of the winding.

Immediately after the extrusion of the polystyrene sheet 21, although foaming starts in the upper layer portion of the polystyrene sheet 21 since the nitrogen dissolved therein is decreased in pressure from the supercritical state to a normal pressure and at the same time the sheet 21 is cooled by air injected from the air ring 22 disposed adjacent to the extrusion die 20 against the cylindrical polystyrene sheet 21 at an acute angle, before the temperature of the foamed polystyrene reaches the glass transition point, the stretching of the sheet in the circumference direction thereof toward the mandrel 24 as well as in the longitudinal direction by applying tension with the nip rolls was completed.

In the course of cooling the cylindrical polystyrene sheet 21, various characteristics of the foamed sheet 21, such as, e.g., cell size, cell shape, and the surface state, will be determined. Accordingly, in this embodiment, an inner cooling ring 26 was provided between the extrusion die 20 and the cooling mandrel 24 to cool the inner surface of the cylindrical sheet 21 by the cooling air injected from the inner cooling ring 26. Furthermore, in order to effectively cool the outer surface of the cylindrical sheet 21, the annular air ring 22 was provided adjacent to the output portion of the extrusion die 20 so that cooling air was supplied from the air ring 22 against the outer surface of the sheet 21 at an acute angle to prevent the deterioration of the cooling effect due to air turbulent flow. The air pressure against the outer surface of the sheet 21 by the air ring 22 and the air pressure against the inner surface of the sheet 21 by the inner cooling ring 26 were set to the same as those employed in producing a conventional heat shrinkable sheet for labels.

The polystyrene sheet 21 cooled by air from the inside and outside thereof was further forcibly cooled to the glass transition temperature or below with a water-cooling type mandrel 24 and a water cooling type mandrel ring 23 disposed before the mandrel 24. The temperature of the mandrel 24 and that of the mandrel ring 23 were set to the same conditions as in a conventional method by water cooling.

Furthermore, the cooled sheet 21 was cut into halves with a cutter 31, and wounded on a winding reel 33, 34 via nip rolls, respectively.

With respect to the above, as disclosed in U.S. Pat. No. 6,406,653, in cooling a co-extruded sheet in which only the non-foamed layer 3 is multilayered, it is known to use a mandrel having a smoothed surface. However, the application of this technique to this embodiment caused a breakage of the sheet, and therefore it was not appropriate. The present inventors found it possible to smoothen the surface of the non-formed layer by initially cooling the sheet 21 by a mandrel ring 23 having a polished nickel/chromium plating surface and then by a conventional cooling mandrel 24. The present inventors also found the fact that this is not sufficient to obtain a high-grade printing surface due to the foamed cells formed in the foamed layer 2 and that it is necessary to minimize the influence of the foamed layer 2 on the surface smoothness of the printing surface of the non-foamed layer 3 by controlling the size of the foamed cells in the foamed layer as small as possible. The present inventors considered that since the thickness of the non-foamed layer 3 to be printed is as small as about 13 μm, the surface state of the foamed cells of the foamed polystyrene layer 2 disposed under the non-foamed layer 3 affects the surface state of the non-foamed layer 3.

Accordingly, the non-foamed layer 3 of the co-extruded sheet 21 consisting of the non-foamed layer 3 and the foamed layer 2 was brought into direct contact with the mandrel ring 23 to perform the cooling, and then cooled by the mandrel 24 to improve the surface smoothness of the non-foamed layer 3. Furthermore, the sheet 21 was quickly and forcibly cooled by applying cooling air from the outside so that the size of the foamed cells in the foamed layer 2 becomes as small as possible.

Next, Examples 2 to 9 will be explained. In Examples 2 to 9, the cooling conditions of the external side of the foamed sheet 21 using air immediately after the extrusion of the foamed sheet, the cooling conditions of the internal side of the foamed sheet 21 by air, the cooling conditions of the internal side of the foamed sheet 21 by the mandrel ring 23, and the cooling conditions of the internal side of the foamed sheet 21 by the mandrel 24, were changed.

Example 2

A formed sheet was obtained under the same conditions as in Example 1 except that the outer air pressure was increased by 34% to cool the outside of the foamed sheet using air.

Example 3

A formed sheet was obtained under the same conditions as in Example 1 except that the outer air pressure was decreased by 50% to cool the outside of the foamed sheet using air.

Example 4

A formed sheet was obtained under the same conditions as in Example 1 except that the inner air pressure was increased by 6% to cool the inner side of the foamed sheet using air.

Example 5

A formed sheet was obtained under the same conditions as in Example 1 except that the inner air pressure was decreased by 50% to cool the inner side of the foamed sheet using air.

Example 6

A formed sheet was obtained under the same conditions as in Example 1 except that the mandrel ring temperature was decreased by 20% to cool the inner side of the foamed sheet with the mandrel ring.

Example 7

A formed sheet was obtained under the same conditions as in Example 1 except that the mandrel ring temperature was increased by 30% to cool the inner side of the foamed sheet with the mandrel ring.

Example 8

A formed sheet was obtained under the same conditions as in Example 1 except that the mandrel temperature was decreased by 20% to cool the inner side of the foamed sheet with the mandrel.

Example 9

A formed sheet was obtained under the same conditions as in Example 1 except that the mandrel temperature was increased by 10% to cool the inner side of the foamed sheet with the mandrel.

Comparative Example 1

A foamed sheet was obtained under the same conditions including the raw material, the composition and the cooling conditions as in Example 1 only except that polymer for a foamed layer was transferred in advance to the annular extrusion die and formed into a cylinder shape within the die before the extrusion, and then a non-foamed layer was coated on the external surface of the cylindrical structure to extrude the two-layered structure from the extrusion die. In detail, in the process of Comparative example 1, the polystyrene resin and propylene resin for the foamed layer and the non-foamed layer as raw materials, nucleus forming agent, polybutene, and high-molecular weight ester were the same as those of Example 1, and the amounts thereof were the same as in Example 1. In addition, nitrogen was used as the foaming agent in the same manner as in Example 1, and the pressure and the amount thereof were the same as those in Example 1. The extruder, the extrusion conditions, the stretching conditions, and the cooling conditions were the same as those in Example 1. However, the only difference between Comparative Example 1 and Example 1 was as follows. Molten resin for the foamed layer was introduced in advance into the die portion provided at the front end of the cooling extruder of the first extruder and formed into a cylinder shape within the die, and then a molten resin for the non-foamed layer was applied onto the upper surface of the cylindrical structure to extrude the cylindrical sheet consisting of an upper non-foamed polystyrene layer and a lower foamed polystyrene layer through the extrusion die. After the extrusion, since the non-foamed layer was disposed on the outer surface of the cylindrical co-extruded sheet and the foamed polystyrene layer was disposed on the inner surface of the cylindrical sheet, the cooling was performed using air from the inside and the outside. The inner surface of the sheet came into contact with the mandrel ring 23 and the surface of the mandrel 24 to be cooled. The non-foamed layer was cooled only by air from the outside through the annular air ring 22 at the exit of the extruder. In brief, the extrusion and the cooling were performed in such a state in which the inner surface and the outer surface of the non-foamed layer/foamed layer sheet were opposite to those in Example 1.

Comparative Example 2

As foamed sheet was obtained under the same conditions as in Comparative Example 1 except that the mixture of nitrogen and air (94% nitrogen) was used as foaming agent. Comparative example 2 was different from Example 1 in that the foamed layer was disposed at the outside of the cylindrical sheet and the mixture of nitrogen and air was used as foaming agent.

As to each foamed sheet of the aforementioned Examples 1-9 and Comparative Examples 1-2, the non-foamed layer surface was subjected to a printing test, and surface glossiness and surface smoothness of the non-foamed layer were evaluated. Furthermore, the dimensions of the foamed cells formed in the foamed layer were measured. The surface glossiness and the surface smoothness were measured according to the standard of the ISO respectively.

In measuring various dimensions of the foamed cells formed in the foamed layer, a cross-section in the extrusion direction (hereinafter referred to as "Machine Direction (MD)") of the foamed sheet and a cross-section perpendicular to the extrusion direction (hereinafter referred to as "Transverse Direction (TD)") of the foamed sheet were observed using a scanning electron microscope to analyze the foamed cells. The dimensions of the foamed cells appeared in the cross-section of the resin (the number, the length, the width, the area, the circumferential length, the aspect ratio, the equivalent diameter, and the density (the total area of the foamed cells per unit area) of the foamed cells) were measured using an image analysis device.

The measurement method will be detailed as follows.

1. Observation of Cross-section of Foamed Polystyrene Sheet using Scanning Electron Microscope and Calculation of Foamed Cell Size 1̂ Treatment of Sample (cutting of the polystyrene sheet):
Deposition of Pt after cutting the sample frozen by nitrogen liquid 2̂ Observation using Electron Microscope:
Each cross-section in the TD and MD were observed using the field emission scanning electron microscope (S-800 type of SEM, manufactured by Hitachi, Ltd.) at 300× magnification under the condition of the accelerating voltage is 6 kV in such a manner that the entire cross-section was displayed within one screen. Two points were observed. In the TD, the observation was performed such that the entire thickness of the sheet was displayed at 300× magnification. In the MD, in the same manner as in the TD observation, the observation was performed such that the entire thickness of the sheet was displayed at 300× magnification. This observation was repeated three times. Tow points were observed.

3̂ Measurement of Size of Foamed cell:
The secondary electron cross-sectional image of each foamed cell of the foamed sheet obtained by the scanning electron microscope at 300× magnification was correctly decaled on a transparent sheet together with criteria showing length and area. Thereafter, the image was read with a personal computer and binarized to obtain a foamed cell image with a clear boundary. Then, each parameter of the foamed call image was measured with image processing software "image pro plus version 4.0" manufactured by Media Cybernetics, Inc.

Concretely, as shown in FIG. 4, the length L and the width W of the foamed cell in the sheet cross-section in the MD were defined as the longest cell length and the longest width of the foamed cell formed in a shape of a leaf extending almost in parallel to the non-foamed surface. The length L and the width W were optically measured and the average length and the average width were obtained. The width W and the height H of the foamed cell in the TD were defined as the longest width and the highest height of the foamed cell extending almost in parallel to the non-foamed surface, respectively, and measured in the same manner as mentioned above. Then, the average width and the average height were obtained.

As to the number of cells, the binarized number of foamed cells was counted and converted into the number of foamed cells per unit area ($mm^2$).

As to the area of the foamed cell and the circumferential length of the foamed cell, the area of each cell and the circumferential length of each cell were measured using the image processing software and the average values thereof were obtained in the same manner as in the measurement of the length of the cell.

As to the equivalent diameter of the foamed cell, each equivalent diameter was obtained based on measured results by calculation (i.e., 4× the surface area of the foamed cell/the circumferential length of the foamed cell). The average value was calculated from the total area and the total circumferential length of the entire foamed cells using the calculation.

As to the total cell area of the foamed cells per unit area, it was obtained by adding each area of the measured foamed cells and converting it into a unit area per area ($mm^2$).

Each of the aforementioned value is an average of values at two observation points in the cross-section of the foamed sheet.

With respect to the measurement, in the case of a portion in which the interface between the cell and the resin was dim due to burrs, the measurement was performed using the straight lines extending from both sides of the above-mentioned portion. Furthermore, with respect to the image processing of the foamed cell which was not entirely displayed within ends of the field of vision, the field of vision was considered ½ of the size of the foamed cell.

2. Measurement of Surface Smoothness using Print Surf Process (based on ISO 8791-4):

The surface smoothness of the surface of the non-foamed layer (solid layer) of the co-extruded polystyrene sheet was measured at 10 points using Parker Print Surf Flex Tester, manufactured by Lorentzen & Wetter Co., at an air pressure of 300 kPa to obtain the average PPS smoothness and the maximum PPS smoothness.

3. Measurement of Surface Glossiness (based on ISO 2813-1994):

Reflectance of the surface of the non-foamed layer (solid layer) of the co-extruded polystyrene sheet was measured at five points using UGV-5DV, a digital variable angle glossiness meter manufactured by Suga Test Instruments Co., Ltd. in the MD and TD at an incident angle of 60° and light receiving angle of 60°, and the average value was calculated.

4. Printing Test

Clearness of characters printed on the non-foamed layer by electrostatic printing was observed with the naked eye or using an optical microscope (100× magnification), and evaluated by the following three level evaluation.

Print image with a clear boundary: ⊚
Normal print image with a slightly dim boundary: ○
Commercially unacceptable blurred print image: X As to the aforementioned Examples 1-9 and Comparative Examples 1-2, the measured results of the cell width, the cell height, the average cell area, the average circumferential length, the average cell equivalent diameter, the average number of cells per unit area, the total cell area per unit area, the surface glossiness, the PPS smoothness are shown in Tables 1 and 2. Furthermore, as to each of Examples and Comparative Examples, evaluation results on the print clearness and the surface glossiness after printing are also shown in Table 2.

TABLE 1

| | Ave. Cell length L MD: L TD: W (μm/cell) | Ave. Cell height H (μm/cell) | Aspect ratio MD: L/H TD: W/H | Ave. cell area (μm²/cell) | Ave. cell circumferential length (μm/cell) | Ave. cell equivalent diameter (μm) | Ave. cell number (pieces/mm²) | Total cell area/unit area (μm²/μm²) | Glossiness (TD) % | Max. surface smoothness PPS (μm) | Ave. surface smoothness PPS (μm) |
|---|---|---|---|---|---|---|---|---|---|---|---|
| | | | | | MD | | | | | | |
| Example 1 | 131.3 | 12.0 | 11.0 | 1144.3 | 270.7 | 16.9 | 349.5 | 0.454 | 74.96 | 1.25 | 1.07 |
| Example 2 | 157.4 | 10.0 | 15.7 | 1118.4 | 321.8 | 13.9 | 530.0 | 0.587 | 70.96 | 1.33 | 1.18 |
| Example 3 | 163.9 | 11.6 | 14.1 | 1446.0 | 338.0 | 17.1 | 427.2 | 0.618 | 70.08 | 1.34 | 1.26 |
| Example 4 | 118.9 | 10.5 | 11.3 | 992.6 | 246.8 | 16.1 | 523.5 | 0.513 | 69.90 | 1.40 | 1.21 |
| Example 5 | 167.0 | 11.6 | 14.3 | 1462.0 | 342.1 | 17.1 | 438.1 | 0.643 | 69.14 | 1.49 | 1.39 |
| Example 6 | 117.5 | 10.3 | 11.4 | 985.9 | 241.1 | 16.4 | 504.3 | 0.497 | 68.66 | 1.27 | 1.14 |
| Example 7 | 140.4 | 9.7 | 14.5 | 1005.1 | 285.7 | 14.1 | 483.8 | 0.486 | 71.98 | 1.44 | 1.29 |
| Example 8 | 138.4 | 10.4 | 13.3 | 1098.6 | 282.0 | 15.6 | 484.1 | 0.532 | 69.40 | 1.30 | 1.15 |
| Example 9 | 160.6 | 10.5 | 15.3 | 1265.3 | 326.2 | 15.5 | 464.7 | 0.578 | 72.02 | 1.34 | 1.24 |
| Comp. Ex. 1 | 243.3 | 15.0 | 16.2 | 2511.6 | 492.4 | 20.4 | 195.5 | 0.616 | 51.54 | 1.55 | 1.39 |
| Comp. Ex. 2 | 231.5 | 15.0 | 15.4 | 2816.7 | 468.7 | 24.0 | 194.3 | 0.619 | 45.38 | 2.70 | 2.56 |
| | | | | | TD | | | | | | |
| Example 1 | 42.8 | 9.3 | 4.6 | 368.4 | 96.2 | 15.3 | 1602.7 | 0.667 | 37.12 | 1.25 | 1.07 |
| Example 2 | 56.2 | 11.6 | 4.8 | 497.9 | 120.0 | 16.6 | 801.7 | 0.399 | 31.94 | 1.33 | 1.18 |
| Example 3 | 66.2 | 10.5 | 6.3 | 549.1 | 138.0 | 15.9 | 725.4 | 0.398 | 33.40 | 1.34 | 1.26 |
| Example 4 | 60.0 | 11.3 | 5.3 | 515.7 | 126.7 | 16.3 | 629.4 | 0.349 | 33.12 | 1.40 | 1.21 |
| Example 5 | 54.9 | 11.6 | 4.7 | 545.4 | 118.3 | 18.4 | 757.0 | 0.411 | 31.50 | 1.49 | 1.39 |
| Example 6 | 55.2 | 11.3 | 4.9 | 504.9 | 118.2 | 17.1 | 1046.3 | 0.528 | 32.74 | 1.27 | 1.14 |
| Example 7 | 57.9 | 11.1 | 5.2 | 534.8 | 123.5 | 17.3 | 863.8 | 0.461 | 33.60 | 1.44 | 1.29 |
| Example 8 | 57.9 | 10.8 | 5.4 | 511.1 | 123.4 | 16.6 | 887.9 | 0.445 | 30.70 | 1.30 | 1.15 |
| Example 9 | 49.6 | 11.2 | 4.4 | 444.3 | 107.7 | 16.5 | 1014.4 | 0.448 | 33.34 | 1.34 | 1.24 |
| Comp. Ex. 1 | 89.5 | 15.2 | 5.9 | 970.7 | 194.5 | 20.0 | 588.7 | 0.696 | 23.38 | 1.55 | 1.39 |
| Comp. Ex. 2 | 77.9 | 15.2 | 5.1 | 983.0 | 169.6 | 23.2 | 647.9 | 0.763 | 25.18 | 2.70 | 2.56 |

TABLE 2

| | Max. surface smoothness before printing (μm) | Evaluation of print clearness after printing | Glossiness (%) TD | Glossiness (%) MD |
|---|---|---|---|---|
| Example 1 | 1.25 | ⊚ | 37.12 | 74.96 |
| Example 2 | 1.33 | ⊚ | 31.94 | 70.96 |
| Example 3 | 1.34 | ⊚ | 33.40 | 70.08 |
| Example 4 | 1.40 | ⊚ | 33.12 | 69.90 |
| Example 5 | 1.49 | ⊚ | 31.50 | 69.14 |
| Example 6 | 1.27 | ⊚ | 32.74 | 68.66 |
| Example 7 | 1.44 | ⊚ | 33.60 | 71.98 |
| Example 8 | 1.30 | ⊚ | 30.70 | 69.40 |
| Example 9 | 1.34 | ⊚ | 33.34 | 72.02 |
| Com. Ex. 1 | 1.55 | ○ | 23.38 | 51.54 |
| Com. Ex. 2 | 2.70 | X | 25.18 | 45.38 |

The above results revealed that in each of Examples 1-9 in which the extrusion and cooling the polystyrene sheet was reversed with respect to a conventional method, the surface glossiness of the non-foamed layer in the MD as well as in the TD exceeded that of each of Comparative Examples 1-2. In each of Examples 1-9, the surface smoothness was smaller than that of each of Comparative Examples 1-2, and a polystyrene foamed sheet excellent in printing nature was obtained.

In Examples 1-9, even after printing, the print clearness was excellent, and a label having excellent surface glossiness and high-grade texture was obtained.

From the above results, it is understood that a heat shrinkable foamed sheet satisfying at least the following conditions (1)-(7) is excellent in surface smoothness, printing nature, and glossiness and can provide high-grade nature.

[Conditions]

(1) the non-foamed layer is about 1.49 μm or less in maximum surface smoothness measured in accordance with ISO8791-4, and/or (2) the average equivalent diameter of the foamed cells in the cross-section taken along the extrusion direction of the formed layer is about 17.1 μm or less and the average equivalent diameter of the foamed cells in the cross-section taken along the direction perpendicular to the extrusion direction is about 18.4 μm or less, and/or (3) the average length of the foamed cells of the foamed layer in the cross-section taken along the extrusion direction of the formed layer is about 167.0 μm or less and the average length of the foamed cells of the foamed layer in the cross-section taken along the direction perpendicular to the extrusion direction of the formed layer is about 66.2 μm or less, and/or (4) the average height of the foamed cells formed in the foamed layer in the cross-section taken along the extrusion direction of the formed layer is about 12.0 μm or less and the average height of the foamed cells formed in the foamed layer in the cross-section taken along the direction perpendicular to the extrusion direction of the formed layer is about 11.6 μm or less, and/or (5) the average area of the foamed cells in the cross-section taken along the extrusion direction of the formed layer is about 1,462.0 μm²/cell or less and the average area of the foamed cells in the cross-section taken along the direction perpendicular to the extrusion direction of the formed layer is about 549.1 μm²/cell or less, and/or (6) the average circumferential length of the foamed cells in the cross-section taken along the extrusion direction of the formed layer is about 342.1 μm or less, and/or and the average circumferential length of the foamed cells of the foamed layer in the cross-section taken along the direction perpendicular to the extrusion direction of the formed layer is about 138.0 μm or less, (7) the average number of foamed cells formed in the foamed layer per unit area in the cross-section taken along the extrusion direction of the formed layer is about 349.5 cells/mm² or more and exceeds the average number of the foamed cells formed in the foamed layer per unit area in the cross-section taken along the direction perpendicular to the extrusion direction of the formed layer is about 647.9 cells/mm².

Next, based on the above test data, the present inventors further conducted an investigation on the correlation between the glossiness/smoothness of the surface of the non-foamed layer before printing and each cell parameter. The results are shown in Tables 3 and 4.

TABLE 3

Correlation expression and t-statistical evaluation

| | Correlation | $r^2$ | Correlation efficient r | $t_0$*[1] | t(9, 0.01) | t(9, 0.05) | Evaluation result |
|---|---|---|---|---|---|---|---|
| MD | | | | | | | |
| Smoothness vs Ave. Equivalent diameter | y = 0.1194x − 0.539 | 0.708 | 0.8414 | 4.671 | 3.25 | 2.262 | 1% Significant: Highly correlated |
| Smoothness vs Ave. Circumferential length | y = 0.0034x + 0.3838 | 0.4603 | 0.6785 | 2.771 | 3.25 | 2.262 | 5% Significant: Correlated |
| Smoothness vs Ave. Cell area | y = 0.0005x + 0.7296 | 0.6585 | 0.8115 | 4.166 | 3.25 | 2.262 | 1% Significant: Highly correlated |
| Smoothness vs Ave. Cell length | y = 0.0067x + 0.4093 | 0.4625 | 0.6801 | 2.783 | 3.25 | 2.262 | 5% Significant: Correlated |
| Smoothness vs Ave. Cell height | y = 0.1533x − 0.2729 | 0.4854 | 0.6967 | 2.914 | 3.25 | 2.262 | 5% Significant: Correlated |
| Smoothness vs Ave. Cell number | y = −0.0023x + 2.4547 | 0.461 | 0.679 | 2.774 | 3.25 | 2.262 | 5% Significant: Correlated |
| Smoothness vs Total cell area/unit area | y = 2.6848x − 0.0075 | 0.1772 | 0.4209 | 1.392 | 3.25 | 2.262 | 5% Non-Significant: No correlation |
| Smoothness vs Cell aspect ratio | y = 0.0853x + 0.3098 | 0.1507 | 0.3882 | 1.264 | 3.25 | 2.262 | 5% Non-Significant: No correlation |
| Smoothness vs Glossiness | y = −0.0372x + 3.9718 | 0.7071 | 0.8409 | 4.661 | 3.25 | 2.262 | 1% Significant: Highly correlated |
| TD | | | | | | | |
| Smoothness vs Ave. Equivalent diameter | y = 0.1658x − 1.4207 | 0.8321 | 0.9122 | 6.679 | 3.25 | 2.262 | 1% Significant: Highly correlated |
| Smoothness vs Ave. Circumferential length | y = 0.0086x + 0.3666 | 0.3471 | 0.5892 | 2.187 | 3.25 | 2.262 | 5% Non-Significant: No correlation |
| Smoothness vs Ave. Cell area | y = 0.0016x + 0.5689 | 0.5957 | 0.7718 | 3.642 | 3.25 | 2.262 | 1% Significant: Highly correlated |
| Smoothness vs Ave. Cell length | y = 0.0179x + 0.4075 | 0.3203 | 0.566 | 2.059 | 3.25 | 2.262 | 5% Non-Significant: No correlation |
| Smoothness vs Ave. Cell height | y = 0.1679x − 0.479 | 0.5577 | 0.7468 | 3.369 | 3.25 | 2.262 | 1% Significant: Highly correlated |
| Smoothness vs Total cell number | y = −0.0006x + 1.9948 | 0.161 | 0.4012 | 1.314 | 3.25 | 2.262 | 5% Non-Significant: No correlation |
| Smoothness vs Total cell area/unit area | y = 1.7942x + 0.5841 | 0.3702 | 0.6084 | 2.3 | 3.25 | 2.262 | 5% Significant: Correlated |
| Smoothness vs Aspect ratio | y = 0.0323x + 1.3259 | 0.002 | 0.0447 | 0.134 | 3.25 | 2.262 | 5% Non-Significant: No correlation |
| Smoothness vs Glossiness | y = −0.0682x + 3.6358 | 0.4226 | 0.6501 | 2.567 | 3.25 | 2.262 | 5% Significant: Correlated |

*[1] t-statistical $t_0 = r * \sqrt{(n-2)}/\sqrt{(1-r^2)}$

TABLE 4

Correlation expression and t-statistical evaluation

| | Correlation | $r^2$ | Correlation efficient r | $t_0$*[1] | t(9, 0.01) | t(9, 0.05) | Evaluation result |
|---|---|---|---|---|---|---|---|
| MD | | | | | | | |
| Glossiness vs Ave. Equivalent diameter | y = −2.9214x + 116.42 | 0.828 | 0.9099 | 6.582 | 3.25 | 2.262 | 1% Significant: Highly correlated |
| Glossiness vs Ave. Circumferential length | y = −0.098x + 98.934 | 0.7596 | 0.8716 | 5.333 | 3.25 | 2.262 | 1% Significant: Highly correlated |
| Glossiness vs Ave. Cell area | y = −0.014x + 86.94 | 0.9044 | 0.951 | 9.227 | 3.25 | 2.262 | 1% Significant: Highly correlated |
| Glossiness vs Ave. Cell length | y = −0.1955x + 98.19 | 0.7631 | 0.8736 | 5.384 | 3.25 | 2.262 | 1% Significant: Highly correlated |
| Glossiness vs Ave. Cell height | y = −4.3744x + 117.07 | 0.7717 | 0.8785 | 5.516 | 3.25 | 2.262 | 1% Significant: Highly correlated |
| Glossiness vs Ave. Cell number | y = 0.0642x + 39.925 | 0.6979 | 0.8354 | 4.56 | 3.25 | 2.262 | 1% Significant: Highly correlated |
| Glossiness vs Total cell area/unit area | y = −74.879x + 108.55 | 0.2692 | 0.5188 | 1.821 | 3.25 | 2.262 | 5% Non-significant: No correlation |
| Glossiness vs Cell aspect ratio | y = −2.4438x + 100.61 | 0.2419 | 0.4918 | 1.695 | 3.25 | 2.262 | 5% Non-significant: No correlation |
| Glossiness vs Glossiness | y = −19.026x + 95.113 | 0.7071 | 0.8409 | 4.661 | 3.25 | 2.262 | 1% Significant: Highly correlated |
| TD | | | | | | | |
| Glossiness vs Equivalent diameter | y = −1.4868x + 57.57 | 0.7352 | 0.8574 | 4.999 | 3.25 | 2.262 | 1% Significant: Highly correlated |
| Glossiness vs Circumferential length | y = −0.1294x + 48.347 | 0.8597 | 0.9272 | 7.426 | 3.25 | 2.262 | 1% Significant: Highly correlated |

TABLE 4-continued

Correlation expression and t-statistical evaluation

| | Correlation | $r^2$ | Correlation efficient r | $t_0$*[1] | t(9, 0.01) | t(9, 0.05) | Evaluation result |
|---|---|---|---|---|---|---|---|
| Glossiness vs Ave. cell area | y = −0.0186x + 42.296 | 0.9033 | 0.9504 | 9.169 | 3.25 | 2.262 | 1% Significant: Highly correlated |
| Glossiness vs Ave. cell length | y = −0.2746x + 48.135 | 0.8331 | 0.9127 | 6.703 | 3.25 | 2.262 | 1% Significant: Highly correlated |
| Glossiness vs Ave. cell height | y = −2.0612x + 55.648 | 0.9237 | 0.9611 | 10.438 | 3.25 | 2.262 | 1% Significant: Highly correlated |
| Glossiness vs Total cell number | y = 0.0093x + 23.37 | 0.4574 | 0.6763 | 2.754 | 3.25 | 2.262 | 5% Significant: Correlated |
| Glossiness vs Total cell area/ unit area | y = −14.883x + 38.986 | 0.28 | 0.5292 | 1.871 | 3.25 | 2.262 | 5% Non-significant: No correlation |
| Glossiness vs Aspect ratio | y = −2.5961x + 44.814 | 0.1414 | 0.376 | 1.217 | 3.25 | 2.262 | 5% Non-significant: No correlation |
| Glossiness vs Glossiness | y = −6.2008x + 40.707 | 0.4226 | 0.6501 | 2.567 | 3.25 | 2.262 | 5% Significant: Correlated |

*[1] t-statistical $t_0 = r*\sqrt{(n-2)}/\sqrt{(1-r^2)}$

From the results shown in Table 3, the correlations between the maximum surface smoothness in the MD and each of the parameters are shown in FIGS. 5-11.

Furthermore, from the results shown in Table 3, the correlations between the maximum surface smoothness in the TD and each of the parameters are shown in FIGS. 12-15.

Next, from the results shown in Table 4, the correlations between the glossiness in the MD and each of the parameters are shown in FIGS. 16-22.

Furthermore, from the results shown in Table 4, the correlations between the glossiness in the TD and each of the parameters are shown in FIGS. 23-29.

As will be apparent from the above results, it is confirmed that there is a strong correlation between the surface smoothness and each dimension of the foamed cell and between the glossiness and each dimension of the foamed cell except for certain dimensions. This means that a heat shrinkable foamed sheet excellent in surface nature and printing nature within the present invention can be obtained even if cell dimensions fall outside the aforementioned condition ranges (1) to (7). In other words, based on the aforementioned correlations, it is understood that a heat shrinkable foamed sheet satisfying the following conditions (8) to (14) is excellent in surface smoothness, printing nature, and glossiness and can provide high-grade nature as compared with conventional foamed sheets.

[Conditions]

(8) the non-foamed layer is less than about 1.55 µm in maximum surface smoothness measured in accordance with ISO8791-4,
and/or
(9) the foamed layer is less than about 20.4 µm in average equivalent diameter of foamed cells formed in the foamed layer in a cross-section taken along an extrusion direction of the formed layer and less than about 20.0 µm in average equivalent diameter of foamed cells formed in the foamed layer in a cross-section taken along a direction perpendicular to the extrusion direction,
and/or
(10) the foamed layer is less than about 231.5 µm in average length of foamed cells formed in the foamed layer in a cross-section taken along an extrusion direction of the formed layer,
and/or
(11) the foamed layer is less than about 15.0 µm in average height of foamed cells formed in the foamed layer in a cross-section taken along an extrusion direction of the formed layer and the foamed layer is less than about 15.2 µm on average height of the foamed cells formed in the foamed layer in a cross-section taken along a direction perpendicular to the extrusion direction of the formed layer,
and/or
(12) the foamed layer is less than about 2,511.6 µm$^2$/cell in average area of foamed cells formed in the foamed layer in a cross-section taken along an extrusion direction of the formed layer and the foamed layer is less than about 970.7 µm$^2$/cell in average area of foamed cells formed in the foamed layer in a cross-section taken along a direction perpendicular to the extrusion direction of the formed layer,
and/or
(13) the foamed sheet is less than about 468.7 µm in average circumferential length of foamed cells formed in the foamed layer in a cross-section taken along an extrusion direction of the formed layer,
and/or
(14) the foamed layer exceeds about 195.5 cells/mm$^2$ in average number of foamed cells formed in the foamed layer per unit area in a cross-section taken along an extrusion direction of the formed layer.

In the above explanation, the heat shrinkable foamed sheets consisting of a foamed polystyrene layer and a non-foamed polystyrene layer sheet formed by co-extrusion was exemplified. It should be understood, however, that the present invention is not limited to the above. A heat shrinkable foamed sheet excellent in surface quality can be produced by separately producing a foamed sheet and a non-foamed sheet and then laminating them.

Furthermore, in the above explanation, a foamed sheet formed by two layers, i.e., a foamed layer and a non-foamed layer, was exemplified. However, the present invention is not limited to this. For example, it should be understood that the present invention can also be applied to a multi-layered foamed sheet having three or more layers.

In the aforementioned examples, the method for cooling the extruded foamed sheet was revised as opposed to a conventional method. That is, a conventional method for cooling a non-foamed layer (surface skin layer) is applied to the cooling of a foamed layer and a conventional method for cooling a foamed layer (core layer) is applied to the cooling of a non-formed layer. Accordingly, it is considered that the cooling speed of the foamed layer is enhanced, causing an improved surface smoothness of the foamed layer, which in turn results in excellent surface smoothness of the non-foamed layer.

In the aforementioned examples, the foamed sheet was subjected to a required extension treatment between the extrusion die and the cooling mandrel. In detail, the cylindrical sheet extruded from the annular die of the extruder is stretched in the circumferential direction thereof by blowing before being cooled to the glass transient point or below and also stretched in the longitudinal direction thereof by a tensile force applied by nip rolls. Thus, the foamed cell was formed not into a circular shape but into a flattened shape extended both in the circumferential direction and in the longitudinal direction and very small in size. Accordingly, it is considered that the small dimensions resulted in small surface roughness of the foamed layer surface at the boundary of the foamed layer/non-foamed layer, which made a positive impact on the non-foamed layer as a surface skin layer to thereby improve the surface smoothness and the glossiness.

Furthermore, it is also considered that the cooling of the extruded foamed sheet performed by bringing the surface of the non-formed layer into direct contact with the mandrel ring was contributed to the notable improvement of the surface smoothness and glossiness of the surface of the non-foamed layer.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

The invention claimed is:
1. A heat shrinkable foamed sheet, comprising:
a foamed layer constituting a core layer; and
a non-foamed layer constituting a surface skin layer integrally formed on the foamed layer,
wherein the non-foamed layer is less than about 1.55 µm in maximum surface smoothness measured in accordance with ISO8791-4, and
wherein cells in the foamed layer have an aspect ratio of length to height of 11.0 to 15.7 in a machine direction.

2. The heat shrinkable foamed sheet as recited in claim 1, wherein a maximum surface smoothness is about 1.49 µm or less.

3. A heat shrinkable foamed sheet, comprising:
a foamed layer constituting a core layer; and
a non-foamed layer constituting a surface skin layer integrally formed on the foamed layer,
wherein the foamed layer is less than about 20.4 µm in average equivalent diameter of
foamed cells formed in the foamed layer in a cross-section taken along an extrusion direction of the foamed layer and less than about 20.0 µm in average equivalent diameter of foamed cells formed in the foamed layer in a cross-section taken along a direction perpendicular to the extrusion direction, and
wherein cells in the foamed layer have an aspect ratio of length to height of 11.0 to 15.7 in a machine direction.

4. The heat shrinkable foamed sheet as recited in claim 3, wherein the average equivalent diameter of the foamed cell in the cross-section taken along the extrusion direction of the foamed layer is about 18.8 µm or less and the average equivalent diameter of the foamed cell in the cross-section taken along the direction perpendicular to the extrusion direction is about 19.2 µm or less.

5. The heat shrinkable foamed sheet as recited in claim 3, wherein the average equivalent diameter of the foamed cell in the cross-section taken along the extrusion direction of the foamed layer is about 17.1 µm or less and the average equivalent diameter of the foamed cell in the cross-section taken along the direction perpendicular to the extrusion direction is about 18.4 µm or less.

6. The heat shrinkable foamed sheet as recited in any one of claims 3 to 5, wherein a maximum surface smoothness of the non-foamed layer is less than about 1.55 µm.

7. The heat shrinkable foamed sheet as recited in any one of claims 3 to 5, wherein a maximum surface smoothness of the non-foamed layer is about 1.49 µm or less.

8. A heat shrinkable foamed sheet, comprising:
a foamed layer constituting a core layer; and
a non-foamed layer constituting a surface skin layer integrally formed on the foamed layer,
wherein the foamed layer is less than 231.5 µm in average length of a foamed cell of the
foamed layer in a cross-section taken along an extrusion direction of the foamed layer, and
wherein cells in the foamed layer have an aspect ratio of length to height of 11.0 to 15.7 in a machine direction.

9. The heat shrinkable foamed sheet as recited in claim 8, wherein the average length of the foamed cell of the foamed layer in the cross-section taken along the extrusion direction of the foamed layer is about 199.3 µm or less.

10. The heat shrinkable foamed sheet as recited in claim 8, wherein the average length of the foamed cell of the foamed layer in the cross-section taken along the extrusion direction of the foamed layer is about 167.0 µm or less and the average length of the foamed cell of the foamed layer in the cross-section taken along the direction perpendicular to the extrusion direction of the foamed layer is about 66.2 µm or less.

11. The heat shrinkable foamed sheet as recited in any one of claims 8 to 10, wherein a maximum surface smoothness of the non-foamed layer is less than about 1.55 µm.

12. The heat shrinkable foamed sheet as recited in any one of claims 8 to 10, wherein a maximum surface smoothness of the non-foamed layer is about 1.49 µm or less.

13. A heat shrinkable foamed sheet, comprising:
a foamed layer constituting a core layer; and
a non-foamed layer constituting a surface skin layer integrally formed on the foamed layer,
wherein the average height of the foamed cells formed in the foamed layer in a cross-section taken along an extrusion direction of the foamed layer is less than about 15.0 µm and the average height of the foamed cells formed in the foamed layer in a cross-section taken along a direction perpendicular to the extrusion direction of the foamed layer is less than about 15.2 µm, and
wherein cells in the foamed layer have an aspect ratio of length to height of 11.0 to 15.7 in a machine direction.

14. The heat shrinkable foamed sheet as recited in claim 13, wherein the average height of the foamed cells formed in the foamed layer in the cross-section taken along the extrusion direction of the foamed layer is about 13.5 µm or less and the average height of the foamed cells formed in the foamed layer in the cross-section taken along the direction perpendicular to the extrusion direction of the foamed layer is about 13.4 µm or less.

15. The heat shrinkable foamed sheet as recited in claim 13, wherein the average height of the foamed cells formed in the foamed layer in the cross-section taken along the extrusion direction of the foamed layer is about 12.0 µm or less and the average height of the foamed cells formed in the foamed layer in the cross-section taken along the direction perpendicular to the extrusion direction of the foamed layer is about 11.6 µm or less.

16. The heat shrinkable foamed sheet as recited in any one of claims 13 to 15, wherein a maximum surface smoothness of the non-foamed layer is less than about 1.55 µm.

17. The heat shrinkable foamed sheet as recited in any one of claims 13 to 15, wherein a maximum surface smoothness of the non-foamed layer is about 1.49 µm or less.

18. A heat shrinkable foamed sheet, comprising:
a foamed layer constituting a core layer; and
a non-foamed layer constituting a surface skin layer integrally formed on the foamed layer,
wherein the foamed layer is less than about 2,511.6 µm²/cell in average area of foamed cells formed in the foamed layer in a cross-section taken along an extrusion direction of the foamed layer and the foamed layer is less than about 970.7 µm²/cell in average area of foamed cells formed in the foamed layer in a cross-section taken along a direction perpendicular to the extrusion direction of the foamed layer, and
wherein cells in the foamed layer have an aspect ratio of length to height of 11.0 to 15.7 in a machine direction.

19. The heat shrinkable foamed sheet as recited in claim 18, wherein the average area of the foamed cells in the cross-section taken along the extrusion direction of the foamed layer is about 1,986.8 µm²/cell or less and the average area of the foamed cells in the cross-section taken along the direction perpendicular to the extrusion direction of the foamed layer is about 759.5 µm²/cell or less.

20. The heat shrinkable foamed sheet as recited in claim 18, wherein the average area of the foamed cells in the cross-section taken along the extrusion direction of the foamed layer is about 1,462.0 µm²/cell or less and the average area of the foamed cells in the cross-section taken along the direction perpendicular to the extrusion direction of the foamed layer is about 549.1 µm²/cell or less.

21. The heat shrinkable foamed sheet as recited in any one of claims 18 to 20, wherein a maximum surface smoothness of the non-foamed layer is less than about 1.55 µm.

22. The heat shrinkable foamed sheet as recited in any one of claims 18 to 20, wherein a maximum surface smoothness of the non-foamed layer is about 1.49 µm or less.

23. A heat shrinkable foamed sheet, comprising:
a foamed layer constituting a core layer; and
a non-foamed layer constituting a surface skin layer integrally formed on the foamed layer,
wherein the foamed sheet is less than about 468.7 µm in average circumferential length of foamed cells of the foamed layer in a cross-section taken along an extrusion direction of the foamed layer, and
wherein cells in the foamed layer have an aspect ratio of length to height of 11.0 to 15.7 in a machine direction.

24. The heat shrinkable foamed sheet as recited in claim 23, wherein the average circumferential length of the foamed cells of the foamed layer in the cross-section taken along the extrusion direction of the foamed layer is about 405.4 µm or less.

25. The heat shrinkable foamed sheet as recited in claim 23, wherein the average circumferential length of the foamed cells of the foamed layer in the cross-section taken along the extrusion direction of the foamed layer is about 342.1 µm or less and the average circumferential length of the foamed cells of the foamed layer in the cross-section taken along the direction perpendicular to the extrusion direction of the foamed layer is about 138.0 µm or less.

26. The heat shrinkable foamed sheet as recited in any one of claims 23 to 25, wherein a maximum surface smoothness of the non-foamed layer is less than about 1.55 µm.

27. The heat shrinkable foamed sheet as recited in any one of claims 23 to 25, wherein a maximum surface smoothness of the non-foamed layer is about 1.49 µm or less.

28. A heat shrinkable foamed sheet, comprising:
a foamed layer constituting a core layer; and
a non-foamed layer constituting a surface skin layer integrally formed on the foamed layer,
wherein the foamed layer exceeds about 195.5 cells/mm² in average number of foamed cells formed in the foamed layer per unit area in a cross-section taken along an extrusion direction of the foamed layer, and
wherein cells in the foamed layer have an aspect ratio of length to height of 11.0 to 15.7 in a machine direction.

29. The heat shrinkable foamed sheet as recited in claim 28, wherein the average number of the foamed cells formed in the foamed layer per unit area in the cross-section taken along the extrusion direction of the foamed layer is about 272.5 cells/mm² or more.

30. The heat shrinkable foamed sheet as recited in claim 28, wherein the average number of the foamed cells formed in the foamed layer per unit area in the cross-section taken along the extrusion direction of the foamed layer is about 349.5 cells/mm² or more and the average number of the foamed cells formed in the foamed layer per unit area in the cross-section taken along the direction perpendicular to the extrusion direction of the foamed layer exceeds about 647.9 cells/mm².

31. The heat shrinkable foamed sheet as recited in any one of claims 28 to 30, wherein a maximum surface smoothness of the non-foamed layer is less than about 1.55 µm.

32. The heat shrinkable foamed sheet as recited in any one of claims 28 to 30, wherein a maximum surface smoothness of the non-foamed layer is about 1.49 µm or less.

33. A heat shrinkable foamed sheet, comprising:
a foamed layer constituting a core layer; and
a non-foamed layer constituting a surface skin layer integrally formed on the foamed layer,
wherein the foamed layer is about 167.0 μm or less in average length of foamed cells of the foamed layer in a cross-section taken along an extrusion direction of the foamed layer, about 342.1 μm or less in average circumferential length of foamed cells of the foamed layer in the cross-section taken along the extrusion direction of the foamed layer, and about 349.5 cells/mm$^2$ or more in average number of foamed cells formed in the foamed layer per unit area in the cross-section taken along the extrusion direction of the foamed layer, and
wherein cells in the foamed layer have an aspect ratio of length to height of 11.0 to 15.7 in a machine direction.

34. The heat shrinkable foamed sheet as recited in claim 33, wherein a maximum surface smoothness of the non-foamed layer is less than about 1.55 μm.

35. The heat shrinkable foamed sheet as recited in claim 33, wherein a maximum surface smoothness of the non-foamed layer is about 1.49 μm or less.

36. A heat shrinkable foamed sheet, comprising:
a foamed layer constituting a core layer; and
a non-foamed layer constituting a surface skin layer integrally formed on the foamed layer,
wherein the foamed layer is about 66.2 μm or less in average length of foamed cells of the foamed layer in a cross-section taken along a direction perpendicular to an extrusion direction of the foamed layer, about 138.0 μm or less in average circumferential length of foamed cells of the foamed layer in the cross-section taken along the direction perpendicular to the extrusion direction of the foamed layer, and exceeds about 647.9 cells/mm$^2$ in average number of foamed cells formed in the foamed layer per unit area in the cross-section taken along the direction perpendicular to the extrusion direction of the foamed layer, and
wherein cells in the foamed layer have an aspect ratio of length to height of 11.0 to 15.7 in a machine direction.

37. The heat shrinkable foamed sheet as recited in claim 36, wherein a maximum surface smoothness of the non-foamed layer is less than about 1.55 μm.

38. The heat shrinkable foamed sheet as recited in claim 36, wherein a maximum surface smoothness of the non-foamed layer is about 1.49 μm or less.

39. A heat shrinkable foamed sheet, comprising:
a foamed layer constituting a core layer; and
a non-foamed layer constituting a surface skin layer integrally formed on the foamed layer,
wherein the average equivalent diameter of the foamed cell in the cross-section taken along the extrusion direction of the foamed layer is about 17.1 μm or less and the average equivalent diameter of the foamed cell in the cross-section taken along the direction perpendicular to the extrusion direction is about 18.4 μm or less,
wherein the average length of the foamed cell of the foamed layer in the cross-section taken along the extrusion direction of the foamed layer is about 167.0 μm or less and the average length of the foamed cell of the foamed layer in the cross-section taken along the direction perpendicular to the extrusion direction of the foamed layer is about 66.2 μm or less,
wherein the average height of the foamed cells formed in the foamed layer in the cross-section taken along the extrusion direction of the foamed layer is about 12.0 μm or less and the average height of the foamed cells formed in the foamed layer in the cross-section taken along the direction perpendicular to the extrusion direction of the foamed layer is about 11.6 μm or less,
wherein the average area of the foamed cells in the cross-section taken along the extrusion direction of the foamed layer is about 1,462.0 μm$^2$/cell or less and the average area of the foamed cells in the cross-section taken along the direction perpendicular to the extrusion direction of the foamed layer is about 549.0 μm$^2$/cell or less,
wherein the average circumferential length of the foamed cells of the foamed layer in the cross-section taken along the extrusion direction of the foamed layer is about 342.1 μm or less and the average circumferential length of the foamed cells of the foamed layer in the cross-section taken along the direction perpendicular to the extrusion direction of the foamed layer is about 138.0 μm or less,
wherein the average number of the foamed cells formed in the foamed layer per unit area in the cross-section taken along the extrusion direction of the foamed layer is about 349.5 cells/mm$^2$ or more and the average number of the foamed cells formed in the foamed layer per unit area in the cross-section taken along the direction perpendicular to the extrusion direction of the foamed layer exceeds about 647.9 cells/mm$^2$, and
wherein cells in the foamed layer have an aspect ratio of length to height of 11.0 to 15.7 in a machine direction.

40. The heat shrinkable foamed sheet as recited in claim 39, wherein a maximum surface smoothness of the non-foamed layer is less than about 1.55 μm.

41. The heat shrinkable foamed sheet as recited in claim 39, wherein a maximum surface smoothness of the non-foamed layer is about 1.49 μm or less.

42. The heat shrinkable foamed sheet as recited in claim 1 or 2,
wherein the foamed layer is formed by extruding a melt from a co-extrusion two layer annular extrusion die of one of extruders, the melt containing a nucleus forming agent, polybutene and at least one of ditridecyl adipate, diisodecyl adipate, and trioctyl trimellitate blended to a polystyrene resin acting as a main component and further containing at least one of nitrogen, carbon dioxide, and a mixture thereof in a supercritical state, and
wherein the non-foamed layer is formed by extruding a resin from the co-extrusion two layer annular extrusion die of the other of the extruders, the resin being obtained by blending polyolefin, and a compatibilizer of polystyrene and polyolefin with polystyrene as a main component, and melting them in a state in which the non-foamed layer is coated on the foamed layer.

43. The heat shrinkable foamed sheet as recited in claim 1 or 2, wherein the non-foamed layer has a print layer on a surface thereof.

44. A container, comprising:
a container main body; and
a heat shrinkable foamed sheet as recited in claim 1 or 2,
wherein the heat shrinkable foamed sheet is closely adhered to a peripheral surface of the container main body in a heat shrank manner.

* * * * *